(12) United States Patent
Han et al.

(10) Patent No.: US 11,910,214 B2
(45) Date of Patent: Feb. 20, 2024

(54) CHANNEL STATE INFORMATION PROCESSING METHOD AND APPARATUS THEREOF

(71) Applicant: HUAWEI TECHNOLOGIES CO., LTD., Guangdong (CN)

(72) Inventors: Wei Han, Shanghai (CN); Lu Wu, Shenzhen (CN); Huangping Jin, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 30 days.

(21) Appl. No.: 16/440,733

(22) Filed: Jun. 13, 2019

(65) Prior Publication Data

US 2019/0297519 A1    Sep. 26, 2019

Related U.S. Application Data

(63) Continuation of application No. PCT/CN2018/085737, filed on May 4, 2018.

(30) Foreign Application Priority Data

May 5, 2017    (CN) .......................... 201710314139.7

(51) Int. Cl.
*H04W 24/10* (2009.01)
*H04L 5/00* (2006.01)
(Continued)

(52) U.S. Cl.
CPC .............. *H04W 24/10* (2013.01); *H04B 7/06* (2013.01); *H04L 5/00* (2013.01); *H04L 5/0048* (2013.01); *H04W 24/02* (2013.01); *H04W 72/54* (2023.01)

(58) Field of Classification Search
None
See application file for complete search history.

(56) References Cited

U.S. PATENT DOCUMENTS

2008/0153506 A1 * 6/2008 Yin .................. H04L 1/0029
                                                                455/452.2
2013/0196675 A1    8/2013 Xiao et al.
(Continued)

FOREIGN PATENT DOCUMENTS

CN    102684835 A    9/2012
CN    103516464 A    1/2014
(Continued)

OTHER PUBLICATIONS

Extended European Search Report issued in European Application No. 18794566.2 dated Nov. 22, 2019, 16 pages.
(Continued)

*Primary Examiner* — Mariela Vidal Carpio
(74) *Attorney, Agent, or Firm* — Fish & Richardson P.C.

(57) ABSTRACT

Embodiments of the present disclosure include channel state information processing methods and apparatuses. One example method includes configuring, by a network device, at least one piece of CSI reporting configuration information and resource configuration information corresponding to the CSI reporting configuration information, where one piece of the CSI reporting configuration information corresponds to at least two pieces of resource configuration information, wherein one resource configuration information is used for interference measurement and includes a CSI-RS resource set, wherein one resource configuration information is used for channel measurement and includes a NZP CSI-RS resource, and wherein one CSI-RS resource set corresponds to at least one CSI report. The at least one piece of CSI
(Continued)

reporting configuration information and the resource configuration information is sent to a terminal device.

20 Claims, 8 Drawing Sheets

(51) Int. Cl.
*H04B 7/06* (2006.01)
*H04W 24/02* (2009.01)
*H04W 72/54* (2023.01)

(56) References Cited

U.S. PATENT DOCUMENTS

| | | | |
|---|---|---|---|
| 2013/0208604 A1* | 8/2013 | Lee | H04L 5/0037 370/252 |
| 2013/0242902 A1* | 9/2013 | Liu | H04W 24/10 370/329 |
| 2013/0301450 A1* | 11/2013 | Geirhofer | H04B 7/024 370/252 |
| 2013/0303090 A1 | 11/2013 | Hammarwall et al. | |
| 2013/0336214 A1* | 12/2013 | Sayana | H04W 72/0413 370/328 |
| 2014/0003345 A1* | 1/2014 | Chu | H04L 1/0026 370/328 |
| 2014/0010126 A1* | 1/2014 | Sayana | H04J 3/1694 370/336 |
| 2014/0112173 A1* | 4/2014 | Hammarwall | H04L 5/0091 370/252 |
| 2014/0269597 A1* | 9/2014 | Park | H04W 52/262 370/329 |
| 2015/0078272 A1* | 3/2015 | Kim | H04L 5/0094 370/329 |
| 2015/0124726 A1* | 5/2015 | Ni | H04W 24/10 370/329 |
| 2015/0131563 A1 | 5/2015 | Guo et al. | |
| 2015/0207600 A1 | 7/2015 | Park et al. | |
| 2016/0094374 A1* | 3/2016 | Koorapaty | H04W 52/0254 370/329 |
| 2016/0149679 A1* | 5/2016 | Frenne | H04L 5/005 370/329 |
| 2016/0212733 A1* | 7/2016 | Davydov | H04L 5/0094 |
| 2016/0277954 A1* | 9/2016 | Frenne | H04B 7/0626 |
| 2016/0301505 A1* | 10/2016 | Furuskog | H04L 5/0048 |
| 2017/0134130 A1 | 5/2017 | Li et al. | |
| 2017/0180100 A1 | 6/2017 | Lee et al. | |
| 2017/0245165 A1* | 8/2017 | Onggosanusi | H04W 24/08 |
| 2018/0042028 A1* | 2/2018 | Nam | H04L 5/0035 |
| 2018/0102817 A1* | 4/2018 | Park | H04B 7/06 |
| 2018/0145735 A1* | 5/2018 | Chen | H04L 5/0057 |
| 2018/0212800 A1* | 7/2018 | Park | H04L 25/03006 |
| 2018/0270847 A1* | 9/2018 | Takeda | H04W 72/04 |
| 2019/0335475 A1* | 10/2019 | Liang | H04W 72/082 |
| 2020/0127786 A1* | 4/2020 | Kwak | H04L 5/0026 |

FOREIGN PATENT DOCUMENTS

| | | |
|---|---|---|
| CN | 103535065 B | 1/2014 |
| CN | 104081813 A | 10/2014 |
| CN | 104219724 A | 12/2014 |
| CN | 105471552 A | 4/2016 |
| WO | 2015163642 A1 | 10/2015 |
| WO | 2015190847 A1 | 12/2015 |

OTHER PUBLICATIONS

Huawei et al., "CSI Acquisition Framework," 3GPP DRAFT; 3GPP RAN WG11 Meeting #88bis, R1-1704226, Spokane, USA, Apr. 3-7, 2017, XP051242378, 8 pages.
Huawei et al., "CSI measurement and reporting for coordinated transmission scheme,", 3GPP Draft; 3GPP TSG RAN WG1 Meeting #88, R1-1701679, Athens, Greece, Feb. 13-17, 2017, XP051208845, 8 pages.
LG Electronics, "Discussion on CSI framework for NR," 3GPP Draft; 3GPP TSG RAN WG1 Meeting #88, R1-1702455, Athens, Greece, Feb. 13-17, 2017, XP051209609, 6 pages.
Office Action issued in Chinese Application No. 201880029929.3 dated Jun. 9, 2020, 17 pages (with English translation).
3GPP TS 38.331 V0.0.2 (Mar. 2017), 3rd Generation Partnership Project; Technical Specification Group Radio Access Network;NR-;Radio Resource Control (RRC);Protocol specification(Release 15), Mar. 2017, 13 pages.
Arikan, "Channel Polarization: A Method for Constructing Capacity-Achieving Codes for Symmetric Binary-Input Memoryless Channels" 2008 IEEE International Symposium on Information Theory, Jul. 2008, 23 pages.
PCT International Search Report and Written Opinion in International Application No. PCT/CN2018/085737, dated Aug. 2, 2018, 13 pages (With partial English translation).
Ricardo Blasco-Serrano et al., "Polar Codes for Cooperative Relaying",IEEE Transactions on Communications, vol. 60, No. 11, Nov. 2012, 11 pages.
Ericsson, "On Dynamic Triggering for CSI Reports and CSI-RS," 3GPP TSG-RAN WG1 #88bis, R1-1705919, Spokane, USA, Apr. 3-7, 2017, 6 pages.
Huawei, HiSilicon, "Channel and Interference Measurement for CSI Acquisition," 3GPP TSG RAN WG1 Meeting #88bis, R1-1705072, Spokane, USA, Apr. 3-7, 2017, 8 pages.
Office Action issued in Chinese Application No. 201880029929.3 dated Oct. 10, 2022, 12 pages.

* cited by examiner

| | CSI-RS resource | TRP 1 | TRP 2 | TRP 3 |
|---|---|---|---|---|
| $S_1$ | A | Non-zero power | Zero power | Zero power |
| $S_2$ | B | Zero power | Non-zero power | Zero power |
| $S_3$ | C | Zero power | Zero power | Non-zero power |
| $I_0$ | D | Zero power | Zero power | Zero power |

| CSI measurement configuration information | | | | | |
|---|---|---|---|---|---|
| | CSI reporting configuration information | | Resource configuration information | Association indication information | |
| #0 | CQI/PMI/RI/CRI | #0 | NZP CSI-RS resource (A) | Link 1 (channel measurement) | CSI reporting configuration information #0 Resource configuration information #0 |
| | and the like | #1 | CSI-RS resource set #1 NZP CSI-RS resource (B) + ZP CSI-RS resource (D); CSI-RS resource set #2 NZP CSI-RS resource (C) + ZP CSI-RS resource (D); CSI-RS resource set #3 NZP CSI-RS resources (B, C) + ZP CSI-RS resource (D); CSI-RS resource set #4 ZP CSI-RS resource (D) | Link 2 (interference measurement) | CSI reporting configuration information #0 Resource configuration information #1 |

FIG. 10

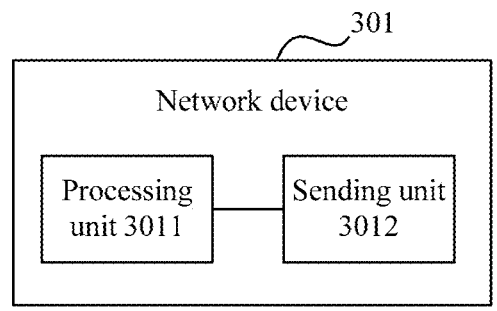

FIG. 11

CHANNEL STATE INFORMATION PROCESSING METHOD AND APPARATUS THEREOF

CROSS-REFERENCE TO RELATED APPLICATIONS

This application is a continuation of International Application No. PCT/CN2018/085737, filed on May 4, 2018, which claims priority to Chinese Patent Application No. 201710314139.7, filed on May 5, 2017. The disclosures of all of the aforementioned patent applications are hereby incorporated by reference in their entireties.

TECHNICAL FIELD

The present invention relates to the communications field, and in particular, to a channel state information processing method and an apparatus thereof.

BACKGROUND

In a multi-base station coordinated multipoint transmission scenario, a network side needs to configure a plurality of channels and interference measurement resources, and a terminal device side needs to measure and feed back channel state information (CSI) in one or more interference cases, so that the network side properly determines a transmission scheme of multi-base station coordinated multipoint transmission, corresponding adaptive link configuration, and a scheduling policy based on a plurality of pieces of CSI.

FIG. 1 is a schematic diagram of a three-base station coordinated multipoint transmission scenario. A transmission reception point (TRP) 1, a TRP 2, and a TRP 3 are coordinated transmission base stations in a coordinating set, and a TRP 4 is an interfering base station located outside the coordinating set. For the TRP 1, the following possible interference combinations exist:

an interference measurement hypothesis 1: interference from the TRP 2 in the coordinating set and interference from the TRP 4 outside the coordinating set;

an interference measurement hypothesis 2: interference from the TRP 3 in the coordinating set and interference from the TRP 4 outside the coordinating set;

an interference measurement hypothesis 3: interference from the TRP 2 and the TRP 3 in the coordinating set and interference from the TRP 4 outside the coordinating set; and an interference measurement hypothesis 4: interference from the TRP 4 outside the coordinating set.

The terminal device needs to measure and feed back CSI in one or more of the foregoing Interference measurement hypotheses, so that the network side determines the multi-base station coordinated transmission scheme, the corresponding adaptive link configuration, and the scheduling policy.

In Long Term Evolution (LTE), the network side configures a CSI process, and the terminal device performs measurement and reporting based on the configured CSI process. A plurality of CSI processes need to be configured, to measure CSI in different interference cases. One CSI process corresponds to one interference measurement hypothesis. When a quantity of coordinated base stations is increased, a quantity of interference measurement hypotheses is also increased. Consequently, a quantity of CSI processes required for measurement and reporting is increased, and a system is not scalable. One CSI process includes one non-zero power channel state information-reference signal (NZP CSI-RS) resource used for channel measurement and one zero power channel state information-reference signal (ZP CSI-RS) resource used for interference measurement, and when the quantity of interference measurement hypotheses is increased, more ZP CSI-RS resources need to be configured. Consequently, a large quantity of downlink transmission resources are occupied.

SUMMARY

Embodiments of the present invention provide a channel state information processing method and an apparatus thereof, so that a system can be scalable, and a case in which excessive downlink transmission resources are occupied can be avoided.

According to a first aspect, an embodiment of the present invention provides a channel state information processing method, including: configuring, by a network device, at least one piece of channel state information CSI reporting configuration information and resource configuration information corresponding to the at least one piece of CSI reporting configuration information, where one piece of the CSI reporting configuration information corresponds to at least two pieces of resource configuration information, one of the at least two pieces of resource configuration information is used for interference measurement and includes a channel state information-reference signal CSI-RS resource set, one of the at least two pieces of resource configuration information is used for channel measurement and includes a non-zero power channel state information-reference signal NZP CSI-RS resource, and one CSI-RS resource set corresponds to at least one CSI report; and sending, by the network device, the at least one piece of CSI reporting configuration information and the resource configuration information corresponding to the at least one piece of CSI reporting configuration information to a terminal device. By using the foregoing configuration, when a quantity of coordinated base stations is increased, only a quantity of configured CSI-RS resource sets needs to be increased, and neither an amount of configured CSI reporting configuration information nor an amount of configured resource configuration information needs to be increased, so that a system can be scalable, and a case in which excessive downlink transmission resources are occupied can be avoided.

In a possible implementation, one CSI-RS resource set includes at least one of an NZP CSI-RS resource and a zero power channel state information-reference signal ZP CSI-RS resource, and one CSI-RS resource set corresponds to at least one interference measurement hypothesis. When the quantity of coordinated base stations is increased, there is no need to configure a large quantity of ZP CSI-RS resources, so that a case in which excessive downlink transmission resources are occupied can be avoided.

In a possible implementation, the network device sends measurement resource indication information to the terminal device, where the measurement resource indication information instructs the terminal device to perform measurement based on N CSI-RS resource sets, the N CSI-RS resource sets are N of M CSI-RS resource sets, and the M CSI-RS resource sets are all CSI-RS resource sets corresponding to the at least one piece of CSI reporting configuration information, where M and N are positive integers, and $1 \leq N \leq M$. The network device instructs the terminal device to perform measurement, so that measurement by the terminal device is targeted.

In a possible implementation, when sending the measurement resource indication information to the terminal device, the network device may further send reporting indication information to the terminal device, where the reporting indication information instructs the terminal device to report L CSI reports, and the L CSI reports are L of N' CSI reports corresponding to the N CSI-RS resource sets, where L and N' are positive integers, $1 \leq L \leq N'$, and $N \leq N'$. Further, the reporting indication information is used to instruct the terminal device to perform reporting, so that reporting is targeted.

In a possible implementation, the reporting indication information further indicates an identifier of a CSI-RS resource set corresponding to each of the L CSI reports, so that the terminal device performs reporting based on the indicated identifier of the CSI-RS resource set; or the reporting indication information further instructs the terminal device to report an identifier of a CSI-RS resource set corresponding to each of the L CSI reports, so that the network device establishes a correspondence between the CSI report and the CSI-RS resource set.

In a possible implementation, the network device sends reporting indication information to the terminal device, where the reporting indication information instructs the terminal device to report K CSI reports, the K CSI reports are K of M' CSI reports corresponding to M CSI-RS resource sets, and the M CSI-RS resource sets are all CSI-RS resource sets corresponding to the at least one piece of CSI reporting configuration information, where M, M', and K are positive integers, $1 \leq K \leq M'$, and $M \leq M'$. The reporting indication information is used to instruct the terminal device to report the K CSI reports that are in the M' CSI reports and that are obtained through measurement, so that reporting is targeted.

In a possible implementation, the reporting indication information further indicates an identifier of a CSI-RS resource set corresponding to each of the K CSI reports, so that the terminal device performs reporting based on the indicated identifier of the CSI-RS resource set; or the reporting indication information further instructs the terminal device to report an identifier of a CSI-RS resource set corresponding to each of the K CSI reports, so that the network device establishes a correspondence between the CSI report and the CSI-RS resource set.

In a possible implementation, the network device configures association indication information corresponding to the at least one piece of CSI reporting configuration information, where one piece of the CSI reporting configuration information corresponds to at least two pieces of association indication information; one of the at least two pieces of association indication information indicates an identifier of the CSI reporting configuration information and an identifier of one piece of the resource configuration information, and indicates that the resource configuration information is used for channel measurement; and one of the at least two pieces of association indication information indicates the identifier of the CSI reporting configuration information and an identifier of one piece of the resource configuration information, and indicates that the resource configuration information is used for interference measurement; and the network device sends the association indication information corresponding to the at least one piece of CSI reporting configuration information to the terminal device.

According to a second aspect, an embodiment of the present invention provides a network device. The network device has a function of implementing behavior of the network device in the method described in the first aspect. The function may be implemented by hardware, or by hardware executing corresponding software. The hardware or software includes one or more modules corresponding to the function.

In a possible implementation, the network device includes a processing unit and a sending unit. The processing unit is configured to configure at least one piece of CSI reporting configuration information and resource configuration information corresponding to the at least one piece of CSI reporting configuration information, where one piece of the CSI reporting configuration information corresponds to at least two pieces of resource configuration information, one of the at least two pieces of resource configuration information is used for interference measurement and includes a CSI-RS resource set, one of the at least two pieces of resource configuration information is used for channel measurement and includes an NZP CSI-RS resource, and one CSI-RS resource set corresponds to at least one CSI report. The sending unit is configured to send the at least one piece of CSI reporting configuration information and the resource configuration information corresponding to the at least one piece of CSI reporting configuration information to a terminal device.

In a possible implementation, a processor is configured to configure at least one piece of channel state information CSI reporting configuration information and resource configuration information corresponding to the at least one piece of CSI reporting configuration information, where one piece of the CSI reporting configuration information corresponds to at least two pieces of resource configuration information, one of the at least two pieces of resource configuration information is used for interference measurement and includes a channel state information-reference signal CSI-RS resource set, one of the at least two pieces of resource configuration information is used for channel measurement and includes a non-zero power channel state information-reference signal NZP CSI-RS resource, and one CSI-RS resource set corresponds to at least one CSI report. A transceiver is configured to send the at least one piece of CSI reporting configuration information and the resource configuration information corresponding to the at least one piece of CSI reporting configuration information to a terminal device.

Based on a same inventive idea, for a problem resolving principle of the network device and a beneficial effect, refer to the method described in the first aspect and the beneficial effect thereof; and for implementation of the network device, refer to implementation of the method described in the first aspect. Repeated parts are not described herein again.

According to a third aspect, an embodiment of the present invention provides a channel state information processing method, including: performing, by a terminal device, measurement based on resource configuration information corresponding to at least one piece of CSI reporting configuration information, where one piece of the CSI reporting configuration information corresponds to at least two pieces of resource configuration information, one of the at least two pieces of resource configuration information is used for interference measurement and includes a channel state information-reference signal CSI-RS resource set, and one of the at least two pieces of resource configuration information is used for channel measurement and includes an NZP CSI-RS resource; and sending, by the terminal device, a CSI measurement result to a network device, where the CSI measurement result includes a CSI report, and one CSI-RS resource set corresponds to at least one CSI report.

In a possible implementation, one CSI-RS resource set includes at least one of an NZP CSI-RS resource and a ZP CSI-RS resource, and one CSI-RS resource set corresponds to at least one interference measurement hypothesis.

In a possible implementation, the performing, by a terminal device, measurement based on resource configuration information corresponding to at least one piece of CSI reporting configuration information includes: performing, by the terminal device, measurement based on the resource configuration information that corresponds to the at least one piece of CSI reporting configuration information and that is used for channel measurement; and performing, by the terminal device, measurement based on the resource configuration information that corresponds to the at least one piece of CSI reporting configuration information and that is used for interference measurement.

In a possible implementation, the performing, by the terminal device, measurement based on the resource configuration information that corresponds to the at least one piece of CSI reporting configuration information and that is used for interference measurement includes: performing, by the terminal device, measurement based on a resource set indicated by measurement resource indication information sent by the network device, where the measurement resource indication information instructs the terminal device to perform measurement based on N CSI-RS resource sets, the N CSI-RS resource sets are N of M CSI-RS resource sets, and the M CSI-RS resource sets are all CSI-RS resource sets corresponding to the at least one piece of CSI reporting configuration information, where M and N are positive integers, and $1 \leq N \leq M$. The terminal device performs measurement based on the measurement resource indication information, so that measurement is targeted.

In a possible implementation, the sending, by the terminal device, a CSI measurement result to a network device includes: sending, by the terminal device, the CSI measurement result to the network device based on reporting indication information sent by the network device, where the CSI measurement result includes L CSI reports, and the L CSI reports are L of N' CSI reports corresponding to the N CSI-RS resource sets, where L and N' are positive integers, $1 \leq L \leq N'$, and $N \leq N'$. The terminal device performs reporting based on the reporting indication information, so that reporting is targeted.

In a possible implementation, the reporting indication information further indicates an identifier of a CSI-RS resource set corresponding to each of the L CSI reports, so that the terminal device performs reporting based on the indicated identifier of the CSI-RS resource set; or the measurement result further includes an identifier of a CSI-RS resource set corresponding to each of the L CSI reports, so that the network device establishes a correspondence between the CSI report and the CSI-RS resource set.

In a possible implementation, the sending, by the terminal device, a CSI measurement result to a network device includes: sending, by the terminal device, the CSI measurement result to the network device based on reporting indication information sent by the network device, where the CSI measurement result includes K CSI reports, the K CSI reports are K of M' CSI reports corresponding to M CSI-RS resource sets, and the M CSI-RS resource sets are all CSI-RS resource sets corresponding to the at least one piece of CSI reporting configuration information, where M, M', and K are positive integers, $1 \leq K \leq M'$, and $M \leq M'$. The terminal device performs reporting based on the reporting indication information, so that reporting is targeted.

In a possible implementation, the reporting indication information further indicates an identifier of a CSI-RS resource set corresponding to each of the K CSI reports, so that the terminal device performs reporting based on the indicated identifier of the CSI-RS resource set; or the measurement result further includes an identifier of a CSI-RS resource set corresponding to each of the K CSI reports, so that the network device establishes a correspondence between the CSI report and the CSI-RS resource set.

In a possible implementation, before the performing, by a terminal device, measurement based on resource configuration information corresponding to at least one piece of channel state information CSI reporting configuration information, the method further includes: receiving, by the terminal device, the at least one piece of CSI reporting configuration information and the resource configuration information corresponding to the at least one piece of CSI reporting configuration information that are sent by the network device.

In a possible implementation, the terminal device receives association indication information that corresponds to the at least one piece of CSI reporting configuration information and that is sent by the network device, where one piece of the CSI reporting configuration information corresponds to at least two pieces of association indication information; one of the at least two pieces of association indication information indicates an identifier of the CSI reporting configuration information and an identifier of one piece of the resource configuration information, and indicates that the resource configuration information is used for channel measurement; and one of the at least two pieces of association indication information indicates the identifier of the CSI reporting configuration information and an identifier of one piece of the resource configuration information, and indicates that the resource configuration information is used for interference measurement.

According to a fourth aspect, an embodiment of the present invention provides a terminal device. The terminal device has a function of implementing behavior of the terminal device in the method described in the third aspect. The function may be implemented by hardware, or by hardware executing corresponding software. The hardware or software includes one or more modules corresponding to the function.

In a possible implementation, the terminal device includes a processing unit and a sending unit. The processing unit is configured to perform measurement based on resource configuration information corresponding to at least one piece of CSI reporting configuration information, where one piece of the CSI reporting configuration information corresponds to at least two pieces of resource configuration information, one of the at least two pieces of resource configuration information is used for interference measurement and includes a channel state information-reference signal CSI-RS resource set, and one of the at least two pieces of resource configuration information is used for channel measurement and includes an NZP CSI-RS resource. The sending unit is configured to send a CSI measurement result to a network device, where the CSI measurement result includes a CSI report, and one CSI-RS resource set corresponds to at least one CSI report.

In a possible implementation, a processor is configured to perform measurement based on resource configuration information corresponding to at least one piece of CSI reporting configuration information, where one piece of the CSI reporting configuration information corresponds to at least two pieces of resource configuration information, one of the at least two pieces of resource configuration information is used for interference measurement and includes a channel state information-reference signal CSI-RS resource set, and one of the at least two pieces of resource configuration information is used for channel measurement and includes an NZP CSI-RS resource. A transceiver is configured to send a CSI measurement result to a network device, where the CSI measurement result includes a CSI report, and one CSI-RS resource set corresponds to at least one CSI report.

Based on a same inventive idea, for a problem resolving principle of the terminal device and a beneficial effect, refer to the method described in the third aspect and the beneficial effect thereof; and for implementation of the terminal device, refer to implementation of the method described in the third aspect. Repeated parts are not described herein again.

According to a fifth aspect, an embodiment of the present invention provides a computer readable storage medium, including an instruction. When the instruction runs on a computer, the computer performs the method described in the first aspect.

According to a sixth aspect, an embodiment of the present invention provides a computer readable storage medium, including an instruction. When the instruction runs on a computer, the computer performs the method described in the third aspect.

In implementation of the embodiments of the present invention, the network device configures and sends the at least one piece of CSI reporting configuration information and the resource configuration information corresponding to the at least one piece of CSI reporting configuration information, so that the terminal device performs measurement based on the resource configuration information corresponding to the at least one piece of CSI reporting configuration information. Therefore, when the quantity of coordinated base stations is increased, only the quantity of configured CSI-RS resource sets needs to be increased, and neither the amount of CSI reporting configuration information nor the amount of resource configuration information needs to be increased, so that the system can be scalable. In addition, a same CSI-RS resource may be shared among a plurality of CSI-RS resource sets, so that downlink transmission resources can be saved, and a degree of sharing a measurement resource and a measurement result can be increased.

BRIEF DESCRIPTION OF DRAWINGS

To describe the technical solutions in the embodiments of the present invention or in the background more clearly, the following briefly describes the accompanying drawings required for describing the embodiments of the present invention or the background.

FIG. 10 is a configuration example table based on FIG. 1 according to an embodiment of the present invention;

FIG. 11 is a schematic diagram of a logical structure of a network device according to an embodiment of the present invention;

DESCRIPTION OF EMBODIMENTS

The embodiments of the present invention may be applied to a wireless communications system. The wireless communications system usually includes a cell, each cell includes one base station (BS), and the base station provides a communication service for a plurality of terminal devices. The base station includes a baseband unit (BBU) and a remote radio unit (RRU). The BBU and the RRU may be disposed at different locations. For example, the RRU is remote and is disposed near a wide region of heavy traffic, and the BBU is disposed in a central equipment room. The BBU and the RRU may be alternatively disposed in a same equipment room. The BBU and the RRU may be alternatively different components in a same rack.

It should be noted that the wireless communications system mentioned in the embodiments of the present invention includes but is not limited to a narrow band-Internet of Things (NB-IoT) system, a Global System for Mobile Communications (GSM), an enhanced data rates for GSM evolution (EDGE) system, a Wideband Code Division Multiple Access (WCDMA) system, a Code Division Multiple Access 2000 (CDMA 2000) system, a Time Division-Synchronization Code Division Multiple Access (TD-SCDMA) system, a Long Term Evolution (LTE) system, an NR system, and a future mobile communications system.

The base station in the embodiments of the present invention is an apparatus that is deployed in a radio access network and that is configured to provide a wireless communication function for a terminal device. The base station may include a macro base station, a micro base station (also referred to as a small cell), a relay station, an access point, a TRP, and the like in various forms. In systems that use different radio access technologies, names of a device that has a base station function may be different. For example, in an LTE system, the device is referred to as an evolved NodeB (eNB or eNodeB), and in a 3rd generation (3G) system, the device is referred to as a NodeB (NB). For ease of description, in all the embodiments of the present invention, all the foregoing apparatuses that provide a wireless communication function for the terminal device are collectively referred to as a network device.

The terminal device in the embodiments of the present invention may include various handheld devices, in-vehicle devices, wearable devices, or computing devices that have a wireless communication function, or other processing devices connected to a wireless modem. The terminal device may also be referred to as a mobile station (MS) or a terminal, and may further include a subscriber unit, a cellular phone, a smartphone, a wireless data card, a personal digital assistant (PDA) computer, a tablet computer, a wireless modem, a handheld device, a laptop computer, a machine type communication (MTC) terminal, and the like. For ease of description, in all the embodiments of the present invention, the devices mentioned above are collectively referred to as the terminal device.

Figure 1:
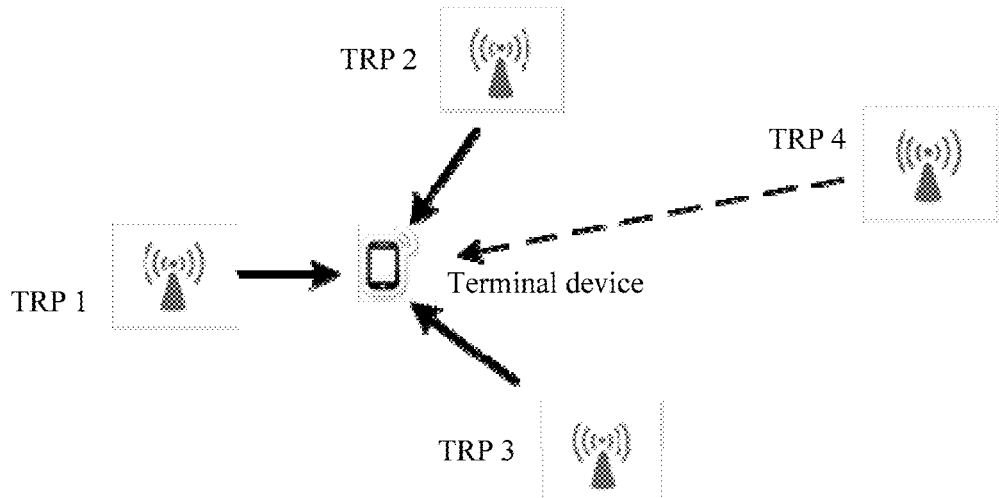
FIG. 1 is a schematic diagram of a three-base station coordinated multipoint transmission scenario.

The embodiments of the present invention may be applied to a schematic diagram of a three-base station coordinated multipoint transmission scenario shown in FIG. 1. A TRP 1, a TRP 2, and a TRP 3 are coordinated transmission base stations in a coordinating set, and a TRP 4 is an interfering base station located outside the coordinating set. For a TRP in the coordinating set, there is at least one of interference caused by other TRPs in the coordinating set to the TRP and interference caused by the TRP outside the coordinating set to the TRP. For example, for the TRP 1, there are four possible interference measurement hypotheses. A first interference measurement hypothesis is interference from the TRP 2 in the coordinating set and interference from the TRP 4 outside the coordinating set, a second interference measurement hypothesis is interference from the TRP 3 in the coordinating set and interference from the TRP 4 outside the coordinating set, a third interference measurement hypothesis is interference from the TRP 2 and the TRP 3 in the coordinating set and interference from the TRP 4 outside the coordinating set, and a fourth interference measurement hypothesis is interference from the TRP 4 outside the coordinating set. For a case in which there are a plurality of interference measurement hypotheses, the terminal device needs to measure and feed back CSI in one or more of the interference measurement hypotheses, so that a network side determines a multi-base station coordinated transmission scheme, corresponding adaptive link configuration, and a scheduling policy.

In LTE, the network side configures one CSI process for one interference measurement hypothesis. When a quantity of coordinated base stations is increased, a quantity of interference measurement hypotheses is also increased. Consequently, a quantity of CSI processes that need to be configured is increased, and a system is not scalable. One CSI process includes one non-zero power channel state information-reference signal NZP CSI-RS resource used for channel measurement and one ZP CSI-RS resource used for interference measurement. When the quantity of interference measurement hypotheses is increased, more ZP CSI-RS resources need to be configured. Consequently, a large quantity of downlink transmission resources are occupied.

In view of this, the embodiments of the present invention provide a channel state information processing method and an apparatus thereof, so that when a quantity of coordinated base stations is increased, the system can be scalable, and a case in which excessive downlink transmission resources are occupied can be avoided.

A 3rd Generation Partnership Project (3GPP) new radio (NR) defines a new CSI measurement and reporting architecture, including CSI reporting configuration information (CSI Reporting Setting), resource configuration information (Resource Setting), and measurement configuration information (Measurement Setting). For one terminal device, one measurement setting is configured, and the measurement setting includes at least one CSI reporting setting, at least one resource setting, and at least one association relationship (Link). One link indicates an association between one CSI reporting setting and one resource setting, and indicates that the resource setting is used for channel measurement or interference measurement.

Figure 2:
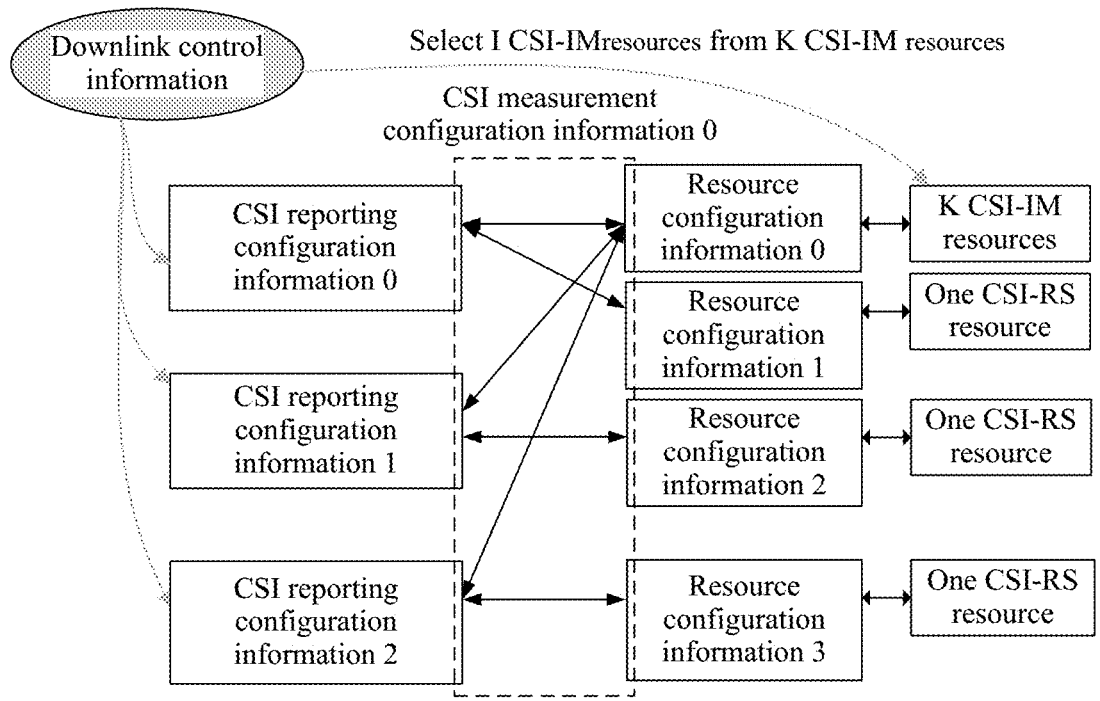
FIG. 2 is an example diagram of an existing measurement configuration indication scheme.

FIG. 2 is an example diagram of a measurement configuration indication scheme based on the CSI measurement and reporting architecture. A CSI reporting setting 0 is used as an example, and the CSI reporting setting 0 is connected to a resource setting 0 and a resource setting 1 by using two links. The resource setting 0 includes K channel state information-interference measurement (CSI-IM) resources, used for interference measurement. The resource setting 1 includes one channel state information-reference signal (CSI-RS) resource, used for channel measurement. In the scheme, I CSI-IM resources are selected from the K CSI-IM resources and used as an interference measurement hypothesis. When CSI is calculated, channel information measured by using the CSI-RS resource in the resource setting 1 is used as a signal part, and channel information measured by using a CSI-IM resource in the resource setting 0 is used as an interference part. If measurement needs to be performed based on a plurality of interference measurement hypotheses, the network side needs to indicate the plurality of interference measurement hypotheses, needs to perform indication a plurality of times, and indicate several CSI-IM resources each time. Consequently, a large quantity of indication overheads exist.

Figure 3:
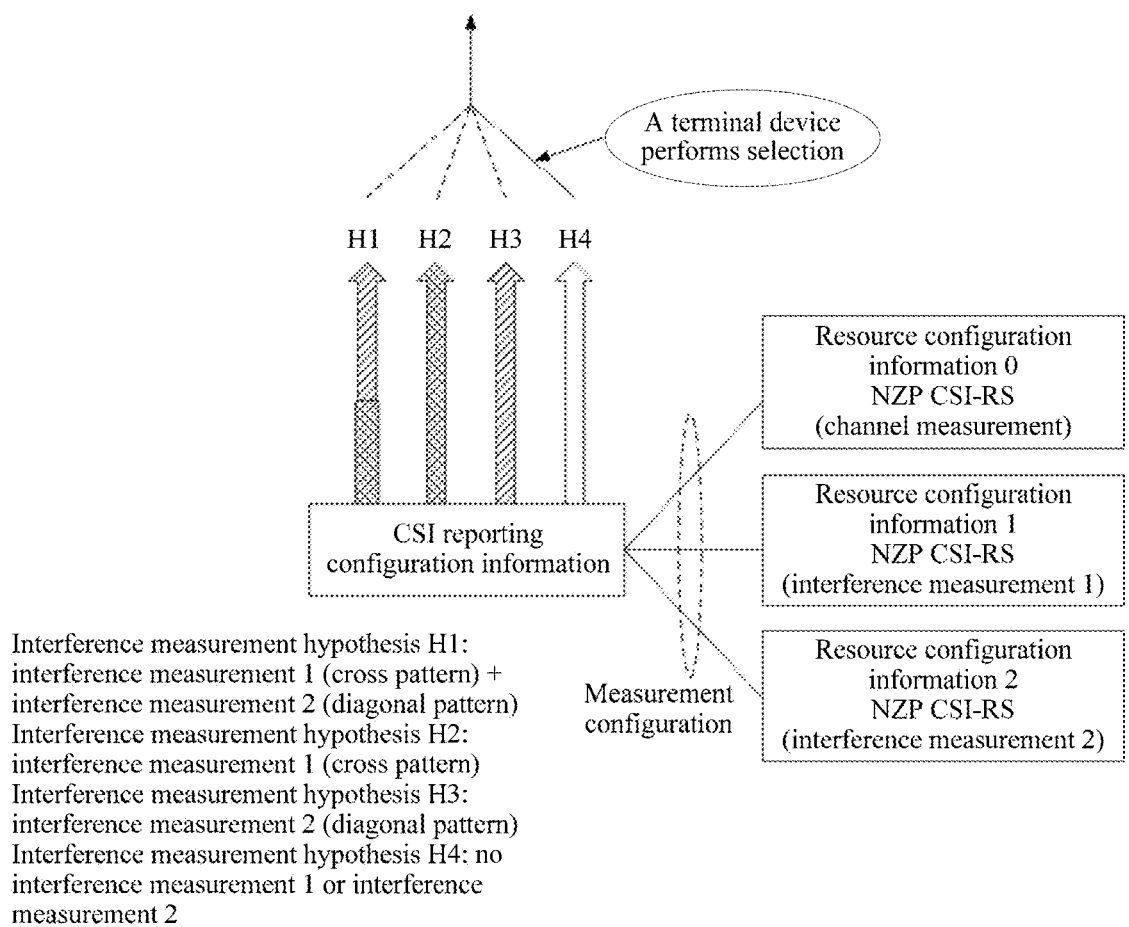
FIG. 3 is an example diagram of an existing measurement and reporting scheme.

FIG. 3 is an example diagram of an existing measurement and reporting method. The network side configures three resource settings. A resource setting 0 corresponds to channel measurement, a resource setting 1 corresponds to interference measurement 1, and a resource setting 2 corresponds to interference measurement 2. In FIG. 3, there are four interference measurement hypotheses (Hypotheses H1 to H4). The terminal device selects, according to a criterion, a CSI report corresponding to one or more interference measurement hypotheses and indication information of the corresponding interference measurement hypothesis, and reports the CSI report and the indication information. The indication information of the interference measurement hypothesis includes a sequence number of one or more resource settings. For example, to report CSI reports corresponding to H1 and H3, sequence numbers 1 and 2 of resource settings corresponding to H1, and a sequence number 2 of a resource setting corresponding to H3 need to be reported. When a quantity of coordinated base stations is increased, a quantity of resource settings is also increased, and a quantity of interference measurement hypotheses and a quantity of resource settings included in each interference measurement hypothesis are also increased, leading to an increase in reporting overheads of the terminal device.

In view of disadvantages that when the quantity of coordinated base stations is increased, indication overheads generated when the network side indicates the interference measurement hypothesis are increased and reporting overheads generated when a terminal side performs reporting are increased, in the channel state information processing method and the apparatus thereof that are provided in the embodiments of the present invention, the network side may instruct the terminal side to selectively perform measurement and reporting, and measurement and reporting are performed based on a CSI-RS resource set, thereby reducing indication overheads and reporting overheads.

The channel state information processing method provided in the embodiments of the present invention is described in detail below with reference to FIG. 4 to FIG. 9.

Figure 4:
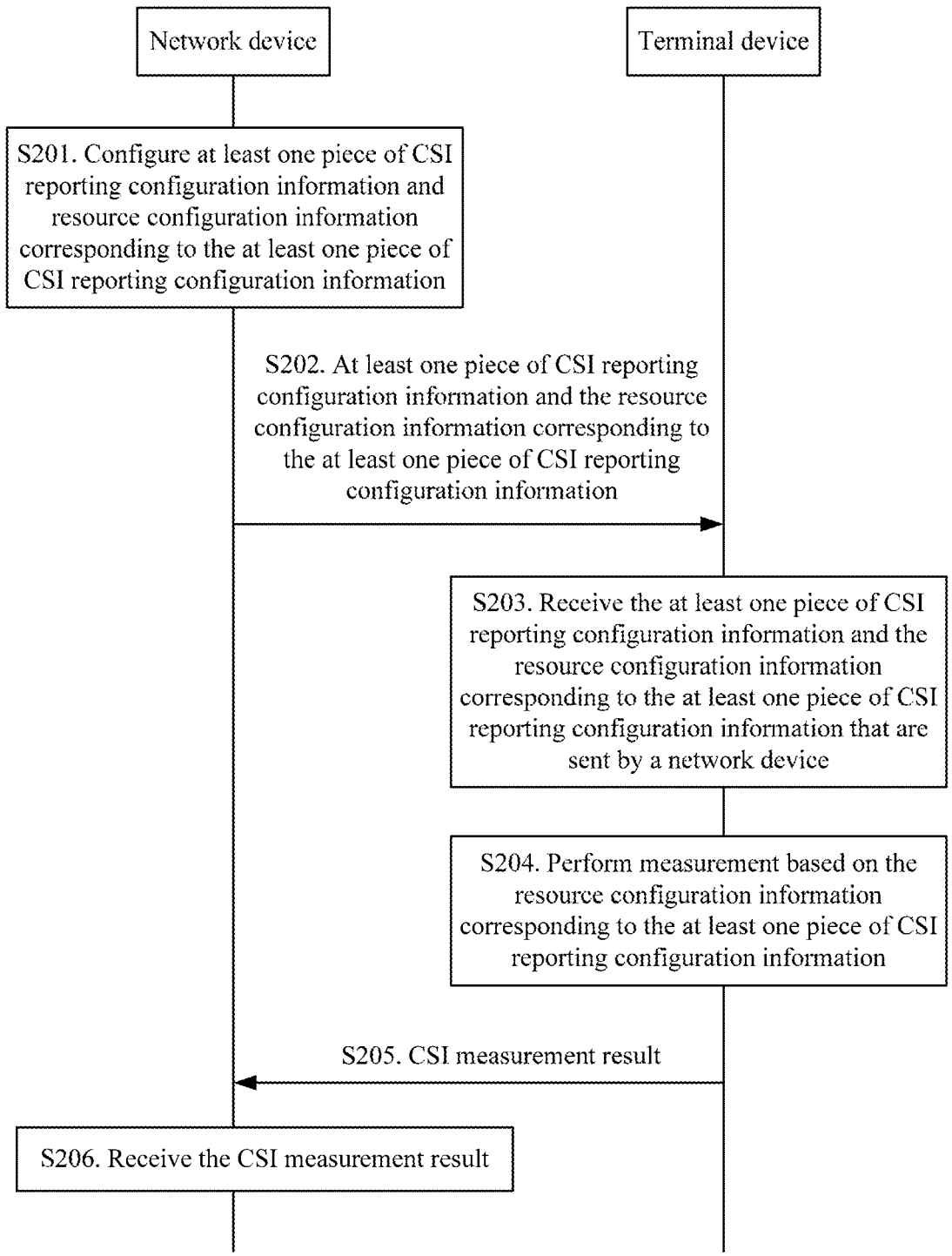
FIG. 4 is a schematic communication diagram of a channel state information processing method according to an embodiment of the present invention.

FIG. 4 is a schematic communication diagram of a channel state information processing method according to an embodiment of the present invention. Description is provided from the perspective of interaction between a network device and a terminal device, and the method includes but is not limited to the following steps.

Step S201: A network device configures at least one piece of CSI reporting configuration information and resource configuration information corresponding to the at least one piece of CSI reporting configuration information.

Specifically, the network device may configure at least one piece of CSI reporting configuration information (CSI Reporting Setting) and resource configuration information (Resource Setting) corresponding to the at least one piece of CSI reporting configuration information for any terminal device in coverage of the network device. One piece of the CSI reporting configuration information corresponds to at least two pieces of resource configuration information. The resource configuration information corresponding to the at least one piece of CSI reporting configuration information is a set, and the set includes at least two pieces of resource configuration information corresponding to each piece of the CSI reporting configuration information. To be specific, the network device may configure at least two pieces of resource configuration information for each of the at least one piece of CSI reporting configuration information in an associated manner, in other words, each piece of the CSI reporting configuration information corresponds to at least two pieces of resource configuration information. This embodiment of the present invention is described by using an example in which there are two pieces of resource configuration information, and a case of at least three pieces of resource configuration information may be obtained by analogy.

One of the at least two pieces of resource configuration information corresponding to one piece of the CSI reporting configuration information is used for interference measurement, includes a CSI-RS resource set, and specifically includes at least one CSI-RS resource set. One of the at least two pieces of resource configuration information is used for channel measurement, includes an NZP CSI-RS resource, and specifically includes at least one NZP CSI-RS resource. One CSI-RS resource set corresponds to at least one interference measurement hypothesis, and the CSI-RS resource set includes at least one of an NZP CSI-RS resource and a ZP CSI-RS resource. For example, one CSI-RS resource set corresponds to one interference measurement hypothesis, and a CSI-RS resource set #1 includes an NZP CSI-RS resource B and a ZP CSI-RS resource D. In this case, the CSI-RS resource set #1 corresponds to one interference measurement hypothesis.

For example, a resource setting 0 and a resource setting 1 are configured for a CSI reporting setting 0 in an associated manner. The resource setting 0 is used for channel measurement and includes at least one NZP CSI-RS resource. The resource setting 1 is used for interference measurement and includes at least one CSI-RS resource set.

One CSI-RS resource set corresponds to at least one CSI report, and one CSI report includes a channel measurement result and an interference measurement result. When the resource configuration information used for channel measurement includes one NZP CSI-RS resource, one CSI-RS resource set corresponds to one CSI report. When the resource configuration information used for channel measurement includes at least two NZP CSI-RS resources, one CSI-RS resource set corresponds to at least two CSI reports.

One piece of CSI reporting configuration information corresponds to at least two pieces of resource configuration information, and resource configuration information used for interference measurement corresponds to at least one CSI-RS resource set, so that it can be learned by analogy that one piece of CSI reporting configuration information corresponds to at least one CSI-RS resource set, and it can be further learned by analogy that the at least one piece of CSI reporting configuration information corresponds to at least one CSI-RS resource set. In all the embodiments of the present invention, it is assumed that a quantity of all CSI-RS resource sets corresponding to the at least one piece of CSI reporting configuration information is M, in other words, the at least one piece of CSI reporting configuration information corresponds to M CSI-RS resource sets, where M is a positive integer, M≥1, and a specific value of M is not limited.

The CSI reporting configuration information includes configuration information of a CSI report. The configuration information of the CSI report may be used to instruct the terminal device to report content of the CSI report. The content of the CSI report may include at least one of parameters such as a channel quality indicator (CQI), a precoding matrix indicator (PMI), a rank indication (RI), and a channel state information-reference signal resource indicator (CRI). The configuration information of the CSI report may further instruct the terminal device to report a time-domain characteristic, a frequency-domain characteristic, and the like.

The network device may configure association indication information corresponding to the at least one piece of CSI reporting configuration information, and one piece of the CSI reporting configuration information corresponds to at least two pieces of association indication information (Link). The association indication information corresponding to the at least one piece of CSI reporting configuration information is a set, and the set includes at least two pieces of association indication information corresponding to each piece of CSI reporting configuration information. To be specific, the network device may configure at least two pieces of association indication information for each piece of CSI reporting configuration information. One of the at least two pieces of association indication information indicates an identifier of the CSI reporting configuration information and an identifier of one piece of the resource configuration information, and indicates that the resource configuration information is used for channel measurement. One of the at least two pieces of association indication information indicates the identifier of the CSI reporting configuration information and an identifier of one piece of the resource configuration information, and indicates that the resource configuration information is used for interference measurement. This embodiment of the present invention is described by using an example in which there are two pieces of association indication information, and a case of at least three pieces of association indication information may be obtained by analogy. For example, a link 1 and a link 2 are configured for the CSI reporting setting 0. The link 1 indicates that an identifier of the CSI reporting setting is 0 and an identifier of the resource setting is 0, and indicates that the resource setting 0 is used for channel measurement. The link 2 indicates that the identifier of the CSI reporting setting is 0 and an identifier of the resource setting is 1, and indicates that the resource setting 1 is used for interference measurement.

The network device may configure, in radio resource control (RRC) signaling, the at least one piece of CSI reporting configuration information and the resource configuration information corresponding to the at least one piece of CSI reporting configuration information. The network device may configure, in RRC signaling, the at least one piece of CSI reporting configuration information, the resource configuration information corresponding to the at least one piece of CSI reporting configuration information, and the association indication information corresponding to the at least one piece of CSI reporting configuration information.

Figures 5, 6:
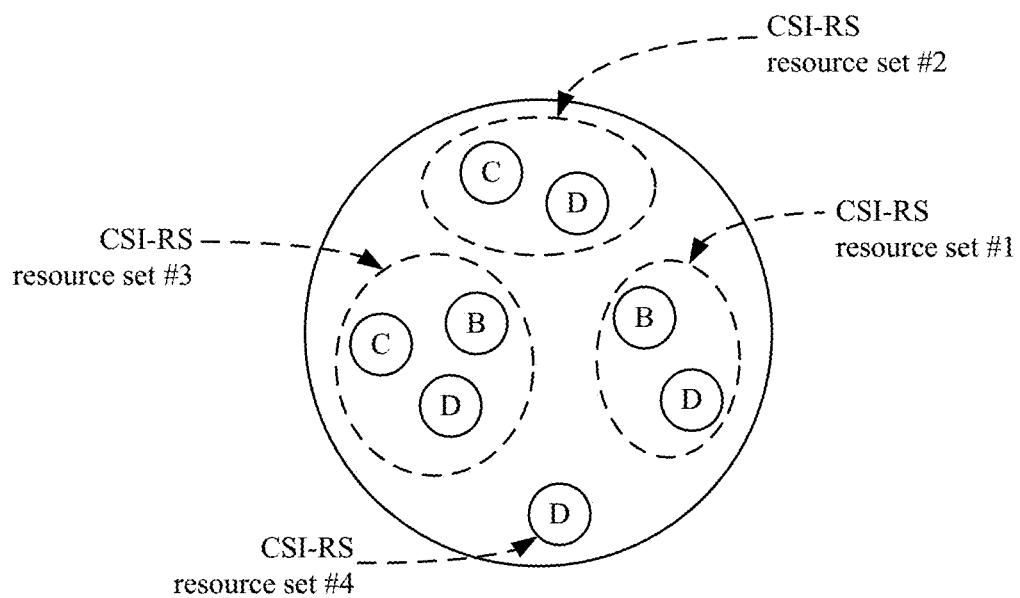
FIG. 5 is an example table of channel state information-reference signal resource allocation based on FIG. 1 according to an embodiment of the present invention.
FIG. 6 is an example diagram of a channel state information-reference signal resource set according to an embodiment of the present invention.

Based on the schematic diagram of the scenario shown in FIG. 1, referring to a CSI-RS resource allocation example table that is based on FIG. 1 and that is shown in FIG. 5, an NZP CSI-RS resource (A) is allocated for a TRP 1, an NZP CSI-RS resource (B) is allocated for a TRP 2, an NZP CSI-RS resource (C) is allocated for a TRP 3, and a ZP CSI-RS resource (D) is allocated for the TRP 1, the TRP 2, and the TRP 3. The NZP CSI-RS resource may be used for interference measurement, or may be used for channel measurement. The ZP CSI-RS resource (D) may be used for interference measurement. According to the CSI-RS resource allocation example table shown in FIG. 5, four interference measurement hypotheses that may exist for the TRP 1 may be represented as:

an interference measurement hypothesis 1: NZP CSI-RS resource (B)+ZP CSI-RS resource (D);
an interference measurement hypothesis 2: NZP CSI-RS resource (C)+ZP CSI-RS resource (D);
an interference measurement hypothesis 3: NZP CSI-RS resource (B)+NZP CSI-RS resource (C)+ZP CSI-RS resource (D); and
an interference measurement hypothesis 4: ZP CSI-RS resource (D).

When one interference measurement hypothesis corresponds to one CSI-RS resource set, the four interference measurement hypotheses may be represented as four CSI-RS resource sets. For the four CSI-RS resource sets, refer to an example diagram of a CSI-RS resource set shown in FIG. 6, and the four CSI-RS resource sets may be represented as:

a CSI-RS resource set #1, including the NZP CSI-RS resource (B) and the ZP CSI-RS resource (D);
a CSI-RS resource set #2, including the NZP CSI-RS resource (C) and the ZP CSI-RS resource (D);
a CSI-RS resource set #3, including the NZP CSI-RS resource (B), the NZP CSI-RS resource (C), and the ZP CSI-RS resource (D); and
a CSI-RS resource set #4, including the ZP CSI-RS resource (D).

It can be learned from the four CSI-RS resource sets that two CSI-RS resource sets may include a same NZP CSI-RS resource, may include a same ZP CSI-RS resource, or may include a same NZP CSI-RS resource and a same ZP CSI-RS resource. Further, it can be learned by analogy that a same CSI-RS resource may be shared among a plurality of CSI-RS resource sets, so that a disadvantage that a large quantity of downlink transmission resources are occupied and CSI processes cannot share a measurement resource and a measurement result in LTE can be overcome, thereby saving downlink transmission resources, and increasing a degree of sharing the measurement resource and the measurement result.

Figure 7:
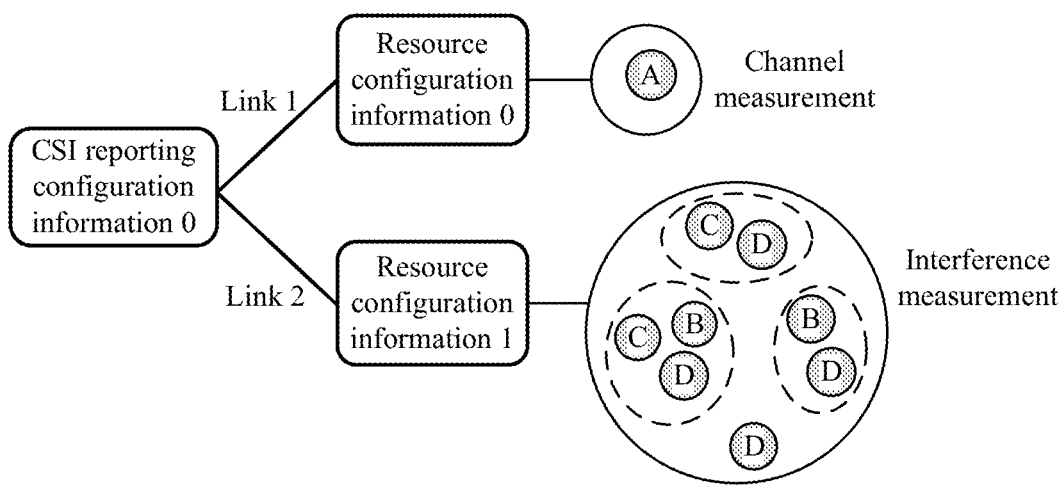
FIG. 7 is a configuration example diagram according to an embodiment of the present invention.

FIG. 7 is a configuration example diagram according to an embodiment of the present invention. Based on the schematic diagram of the scenario shown in FIG. 1, the network device configures the CSI reporting setting 0, and configures the resource setting 0, the resource setting 1, the link 1, and the link 2 for the CSI reporting setting 0 in an associated manner. The link 1 indicates an association between the CSI reporting setting 0 and the resource setting 0, and indicates that the resource setting 0 is used for channel measurement. The link 2 indicates an association between the CSI reporting setting 0 and the resource setting 1, and indicates that the resource setting 1 is used for interference measurement. The resource setting 0 includes the NZP CSI-RS resource (A), and the resource setting 1 includes the four CSI-RS resource sets.

Figure 8:
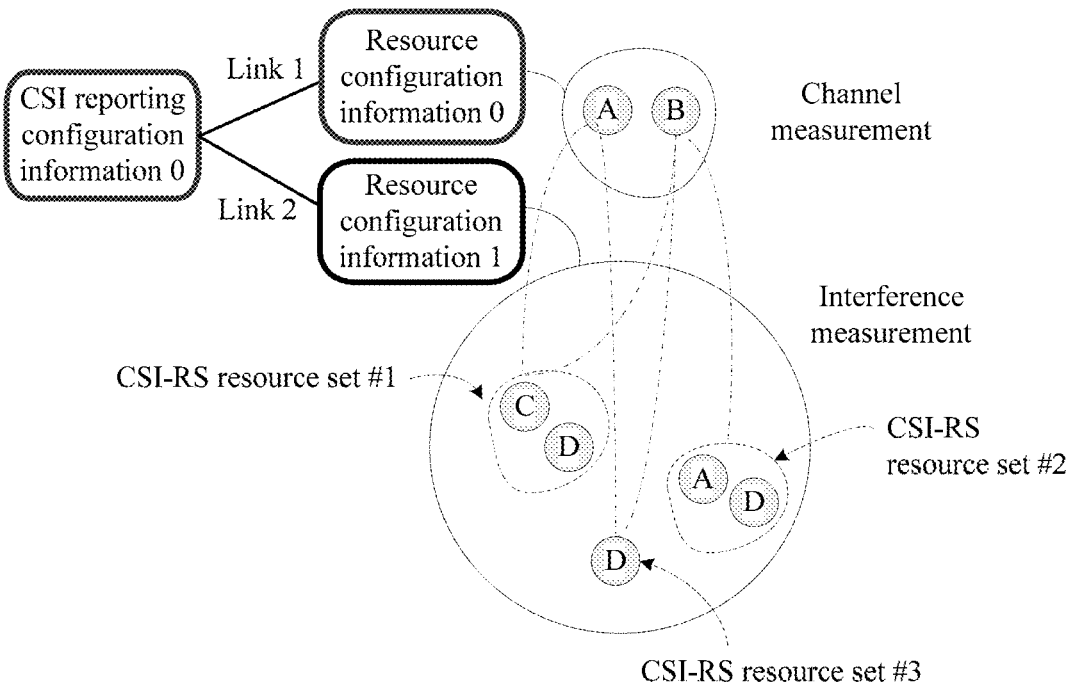
FIG. 8 is another configuration example diagram according to an embodiment of the present invention.

FIG. 8 is another configuration example diagram according to an embodiment of the present invention. The network device configures the CSI reporting setting 0, and configures the resource setting 0, the resource setting 1, the link 1, and the link 2 for the CSI reporting setting 0 in an associated manner. The link 1 indicates an association between the CSI reporting setting 0 and the resource setting 0, and indicates that the resource setting 0 is used for channel measurement. The link 2 indicates an association between the CSI reporting setting 0 and the resource setting 1, and indicates that the resource setting 1 is used for interference measurement. The resource setting 0 includes the NZP CSI-RS resource (A) and the NZP CSI-RS resource (B), and the resource setting 1 includes the following three CSI-RS resource sets:

a CSI-RS resource set #1, including the NZP CSI-RS resource (C) and the ZP CSI-RS resource (D);
a CSI-RS resource set #2, including the NZP CSI-RS resource (A) and the ZP CSI-RS resource (D); and
a CSI-RS resource set #3, including the ZP CSI-RS resource (D).

It should be noted that FIG. 7 and FIG. 8 are described by using one CSI reporting setting as an example, and a case of at least two CSI reporting settings may be obtained by analogy based on FIG. 7 and FIG. 8. FIG. 7 uses an example in which the resource setting 0 includes only the NZP CSI-RS resource (A), FIG. 8 uses an example in which the resource setting 0 includes only two NZP CSI-RS resources, and a case in which the resource configuration information used for channel measurement includes at least two NZP CSI-RS resources may be obtained through extension based on FIG. 8.

When a quantity of NZP CSI-RS resources included in the resource configuration information used for channel measurement is greater than 1, the network device may further configure a correspondence between an NZP CSI-RS resource used for channel measurement and a CSI-RS resource set used for interference measurement. For example, in FIG. 8, the network device configures the following correspondences:

a correspondence 1 between the NZP CSI-RS resource (A) and the CSI-RS resource set #1;
a correspondence 2 between the NZP CSI-RS resource (A) and the CSI-RS resource set #3;
a correspondence 3 between the NZP CSI-RS resource (B) and the CSI-RS resource set #1;
a correspondence 4 between the NZP CSI-RS resource (B) and the CSI-RS resource set #2; and
a correspondence 5 between the NZP CSI-RS resource (B) and the CSI-RS resource set #3.

The correspondences 1 to 5 are used to indicate correspondences between resource configuration information 0 used for channel measurement and resource configuration information 1 used for interference measurement in FIG. 8. If there is also a correspondence between the resource configuration information 0 and resource configuration information 2 that is used for interference measurement, the five correspondences may be referred to as a first correspondence, and a correspondence between an NZP CSI-RS resource in the resource configuration information 0 and a CSI-RS resource set in the resource configuration information 2 is referred to as a second correspondence.

Optionally, the network device may configure, in RRC signaling, the correspondence between an NZP CSI-RS resource used for channel measurement and a CSI-RS resource set used for interference measurement. The RRC signaling may be the same as or different from the RRC signaling for configuring the at least one piece of CSI reporting configuration information.

Optionally, the network device configures, in dynamic signaling, the correspondence between an NZP CSI-RS resource used for channel measurement and a CSI-RS resource set used for interference measurement. The dynamic signaling may be a Media Access Control-Control Element (MAC-CE) or other layer 2 signaling. The dynamic signaling may be alternatively downlink control information (DCI).

By using the foregoing configuration, when a quantity of coordinated base stations is increased, a quantity of interference measurement hypotheses is also increased. In this case, the network device needs to increase only a quantity of CSI-RS resource sets, and does not need to increase a quantity of CSI reporting settings or resource settings, so that a system can be scalable.

Optionally, the network device may further configure, in the at least one piece of CSI reporting configuration information, whether the terminal device performs periodic reporting. For example, the network device configures that the terminal device performs periodicreporting, configures that the terminal device performs aperiodic reporting, or configures that the terminal device performs semi-persistent (semi-persistent) reporting.

Optionally, the network device may further configure, in the resource configuration information, that a CSI-RS resource is periodically sent, or that a CSI-RS resource is aperiodically sent, or that a CSI-RS resource is semi-persistently sent. The CSI-RS resource may be an NZP CSI-RS resource or a ZP CSI-RS resource.

Step S202: The network device sends the at least one piece of CSI reporting configuration information and the resource configuration information corresponding to the at least one piece of CSI reporting configuration information to a terminal device.

Optionally, after sending the at least one piece of CSI reporting configuration information and the resource configuration information corresponding to the at least one piece of CSI reporting configuration information to the terminal device, the network device sends the association indication information corresponding to the at least one piece of CSI reporting configuration information.

Optionally, after sending the association indication information corresponding to the at least one piece of CSI reporting configuration information to the terminal device, the network device sends the at least one piece of CSI reporting configuration information and the resource configuration information corresponding to the at least one piece of CSI reporting configuration information.

Optionally, the network device simultaneously sends the at least one piece of CSI reporting configuration information, the resource configuration information corresponding to the at least one piece of CSI reporting configuration information, and the association indication information corresponding to the at least one piece of CSI reporting configuration information to the terminal device.

The network device may send the at least one piece of CSI reporting configuration information and the resource configuration information corresponding to the at least one piece of CSI reporting configuration information to the terminal device by using RRC signaling. The network device may send the association indication information corresponding to the at least one piece of CSI reporting configuration information to the terminal device by using RRC signaling.

If the network device configures the correspondence between an NZP CSI-RS resource used for channel measurement and a CSI-RS resource set used for interference measurement, the network device further sends the correspondence between an NZP CSI-RS resource used for channel measurement and a CSI-RS resource set used for interference measurement to the terminal device. The network device may send the correspondence by using RRC signaling or the dynamic signaling.

Step S203: The terminal device receives the at least one piece of CSI reporting configuration information and the resource configuration information corresponding to the at least one piece of CSI reporting configuration information that are sent by the network device.

Specifically, the terminal device may receive, by using RRC signaling, the at least one piece of CSI reporting configuration information and the resource configuration information corresponding to the at least one piece of CSI reporting configuration information, and may also receive, by using the RRC signaling, the association indication information corresponding to the at least one piece of CSI reporting configuration information. When receiving the configuration information, the terminal device may store the configuration information.

If the network device sends the correspondence between an NZP CSI-RS resource used for channel measurement and a CSI-RS resource set used for interference measurement, the terminal device further receives the correspondence between an NZP CSI-RS resource used for channel measurement and a CSI-RS resource set used for interference measurement.

Step S204: The terminal device performs measurement based on the resource configuration information corresponding to the at least one piece of CSI reporting configuration information.

Specifically, the terminal device performs measurement based on the resource configuration information that corresponds to the at least one piece of CSI reporting configuration information and that is used for channel measurement. For example, in FIG. 7, the terminal device may perform measurement based on the NZP CSI-RS resource (A), to obtain a channel measurement result. The channel measurement result may be used to calculate at least one of parameters such as a CQI, an RI, a PMI, and a CRI.

The terminal device performs measurement based on the resource configuration information that corresponds to the at least one piece of CSI reporting configuration information and that is used for interference measurement.

In a possible implementation, the terminal device may perform measurement based on the M CSI-RS resource sets corresponding to the at least one piece of CSI reporting configuration information. In other words, the terminal device performs measurement based on all CSI-RS resource sets configured by the network device.

For example, in FIG. 7, the resource setting 0 corresponding to the CSI reporting setting 0 includes one NZP CSI-RS resource (A) used for channel measurement, the resource setting 1 includes four CSI-RS resource sets, and each CSI-RS resource set includes at least one of one ZP CSI-RS resource (D) used for interference measurement and two NZP CSI-RS resources (B, C) used for interference measurement. The terminal device may perform measurement based on the NZP CSI-RS resource (A) used for channel measurement and the four CSI-RS resource sets, to obtain four CSI reports. To be specific, the terminal device obtains one CSI report by performing measurement based on one NZP CSI-RS resource used for channel measurement and one CSI-RS resource set used for interference measurement.

For another example, in FIG. 8, the resource setting 0 corresponding to the CSI reporting setting 0 includes two NZP CSI-RS resources (A, B) used for channel measurement, the resource setting 1 includes three CSI-RS resource sets, and each CSI-RS resource set includes at least one of one ZP CSI-RS resource (D) used for interference measurement and two NZP CSI-RS resources (A, C) used for interference measurement. The terminal device may perform measurement based on the NZP CSI-RS resource (A) used for channel measurement, the CSI-RS resource set #1, and the CSI-RS resource set #3, to obtain two CSI reports; and may perform measurement based on the NZP CSI-RS resource (B) used for channel measurement and the three CSI-RS resource sets, to obtain three CSI reports. To be specific, the terminal device may obtain two CSI reports by performing measurement based on the CSI-RS resource set #1, may obtain one CSI report by performing measurement based on the CSI-RS resource set #2, and may obtain two CSI reports by performing measurement based on the CSI-RS resource set #3.

It may be understood that the possible implementation may correspond to the case in which the network device configures that the terminal device performs periodic reporting, or may correspond to the case in which the network device configures that the terminal device performs aperiodic reporting, or may correspond to the case in which the network device configures that the terminal device performs semi-persistent reporting.

In a possible implementation, the terminal device may perform measurement based on N of the M CSI-RS resource sets corresponding to the at least one piece of CSI reporting configuration information. The N CSI-RS resource sets may be indicated by the network device, N is a positive integer, and $1 \leq N \leq M$.

It may be understood that the possible implementation may correspond to the case in which the network device configures that the terminal device performs aperiodic reporting, or may correspond to the case in which the network device configures that the terminal device performs periodic reporting, or may correspond to the case in which the network device configures that the terminal device performs semi-persistent reporting.

In a possible implementation, the terminal device may perform measurement based on N of the M CSI-RS resource sets corresponding to the at least one piece of CSI reporting configuration information. An identifier of each of the N CSI-RS resource sets may be indicated by the network device, N is a positive integer, and $1 \leq N \leq M$.

It may be understood that the possible implementation may correspond to the case in which the network device configures that the terminal device performs aperiodic reporting, or may correspond to the case in which the network device configures that the terminal device performs semi-persistent reporting.

Specifically, the network device sends measurement resource indication information to the terminal device. The measurement resource indication information instructs the terminal device to perform measurement based on the N CSI-RS resource sets, to be specific, measure interference of the N CSI-RS resource sets. When receiving the measurement resource indication information, the terminal device performs measurement based on the N CSI-RS resource sets.

Optionally, the measurement resource indication information may further indicate the identifier of each of the N CSI-RS resource sets.

Optionally, when a quantity of NZP CSI-RS resources included in the resource configuration information used for channel measurement is greater than 1, the measurement resource indication information may further indicate an identifier of an NZP CSI-RS resource corresponding to each of the N CSI-RS resource sets, for example, indicate the CSI-RS resource set #2 and the NZP CSI-RS resource (A) corresponding to the CSI-RS resource set #2.

Optionally, when a quantity of NZP CSI-RS resources included in the resource configuration information used for channel measurement is greater than 1, the measurement resource indication information indicates an identifier of a correspondence, for example, indicates the correspondence 1, to be specific, instructs the terminal device to perform measurement based on the NZP CSI-RS resource (A) and the CSI-RS resource set #1. In this case, the terminal device performs measurement based on the NZP CSI-RS resource (A), the NZP CSI-RS resource (C), and the ZP CSI-RS resource (D).

The measurement resource indication information may be sent by using dynamic signaling, and the dynamic signaling may be a Media Access Control-Control Element (MAC-CE) or other layer 2 signaling. The dynamic signaling may be alternatively downlink control information (DCI).

When the quantity of NZP CSI-RS resources included in the resource configuration information used for channel measurement is equal to 1, the measurement resource indication information may indicate, in the following two manners, at least one of the identifier of each of the N CSI-RS resource sets and the N CSI-RS resource sets.

Manner 1: The N CSI-RS resource sets may be indicated by using an S-bit bitmap. When a particular bit in the S bits is set, the terminal device is instructed to perform measurement based on a CSI-RS resource set corresponding to the bit. A quantity of bits that are set in the S bits is a value of N. Based on FIG. 7, S represents a quantity of CSI-RS resource sets included in the resource setting 1, and the N CSI-RS resource sets are indicated by using four bits. For example, "0001" indicates that N=1, and it indicates that the network device chooses to activate the CSI-RS resource set #1, to instruct the terminal device to perform measurement based on the CSI-RS resource set #1. For another example, "1010" indicates that N=2, and the network device chooses to activate the CSI-RS resource set #4 and the CSI-RS resource set #2, to instruct the terminal device to perform measurement based on the CSI-RS resource set #4 and the CSI-RS resource set #2.

Manner 2: The N CSI-RS resource sets may be indicated by using $N \times \lceil \log_2^S \rceil$ bits. Based on FIG. 7, N represents a quantity of CSI-RS resource sets required for interference measurement, S represents a quantity of CSI-RS resource sets included in the resource setting 1, and $\lceil \ \rceil$ represents calculating the least integer greater than or equal to a result. $\lceil \log_2^S \rceil$ bits are used to indicate a sequence number of one of the S CSI-RS resource sets, as shown in the following table:

| Sequence number of a CSI-RS resource set | 2-bit indication |
|---|---|
| 1 | 00 |
| 2 | 01 |
| 3 | 10 |
| 4 | 11 |

For example, two bits indicate that N=1, two bits are used to indicate one CSI-RS resource set, and "11" indicates that the network device chooses to activate the CSI-RS resource set #4, to instruct the terminal device to perform measurement based on the CSI-RS resource set #4. For another example, four bits indicate that N=2, four bits are used to indicate two CSI-RS resource sets, and "1101" indicates that the network device chooses to activate the CSI-RS resource set #4 and the CSI-RS resource set #2, to instruct the terminal device to perform measurement based on the CSI-RS resource set #4 and the CSI-RS resource set #2.

In addition to the foregoing two manners, the network device may further perform indication in another indication manner, and a specific used indication manner is not limited in this embodiment of the present invention. The indication manner used by the network device may be notified to the terminal device in advance, so that a CSI-RS resource set used by the terminal device for measurement is the same as a CSI-RS resource set indicated by the network device.

The network device instructs the terminal device to selectively perform measurement and perform interference measurement based on the CSI-RS resource set, so that when the quantity of coordinated base stations is increased, measurement resource indication overheads can be reduced.

Step S205: The terminal device sends a CSI measurement result to the network device.

Specifically, the terminal device sends the CSI measurement result to the network device. The CSI measurement result includes a CSI report, and one CSI-RS resource set corresponds to at least one CSI report.

In a possible implementation, the CSI measurement result includes M' CSI reports. To be specific, M' CSI reports are reported for the M CSI-RS resource sets, that is, at least one CSI report corresponding to each of all CSI-RS resource sets is reported. The CSI measurement result may further include an identifier of a CSI-RS resource set corresponding to each of the M' CSI reports. In the possible implementation, the terminal device performs measurement based on the M CSI-RS resource sets by default, and reports all CSI reports by default. M' is a positive integer, and M≤M'. When one CSI-RS resource set corresponds to one CSI report, M=M'.

It may be understood that the possible implementation may correspond to the case in which the network device configures that the terminal device performs periodic reporting, or may correspond to the case in which the network device configures that the terminal device performs aperiodic reporting, or may correspond to the case in which the network device configures that the terminal device performs semi-persistent reporting.

In a possible implementation, the network device instructs, by using reporting indication information, the terminal device to report a specific quantity of CSI reports, instructs the terminal device to report CSI reports corresponding to specific CSI-RS resource sets, or instructs the terminal device to report CSI reports corresponding to specific correspondences. The terminal device performs reporting based on the reporting indication information.

The reporting indication information may be sent by using RRC signaling, may be configured in the CSI reporting configuration information, or may be configured in RRC signaling other than the CSI reporting configuration information. The reporting indication information may be alternatively sent by using dynamic signaling, and the dynamic signaling may be a MAC-CE or other layer 2 signaling. Alternatively, the dynamic signaling may be DCI.

Optionally, after performing measurement based on the M CSI-RS resource sets, the terminal device performs reporting based on the reporting indication information. The reporting indication information instructs the terminal device to report K CSI reports, and the K CSI reports are K of the M' CSI reports corresponding to the M CSI-RS resource sets, where K is a positive integer, and 1≤K≤M'. In this case, the CSI measurement result includes the K CSI reports.

The K CSI reports may be the first K CSI reports that are in the M' CSI reports and that are arranged in a particular order, for example, the first K CSI reports in an order of priorities, or the first K CSI reports in an order of values of a parameter.

When K=M', the network device instructs the terminal device to report the M' CSI reports corresponding to the M CSI-RS resource sets. When K=1, the network device instructs the terminal device to report one of the M' CSI reports, and the terminal device may report one optimal CSI report in the M' CSI reports. The optimal CSI report may be a CSI report whose particular parameter has a largest value, for example, a CQI has a largest value. When K=M=1, the network device instructs the terminal device to perform measurement based on one CSI-RS resource set and feed back one CSI report, and the terminal device reports one of at least one CSI report obtained through measurement based on the CSI-RS resource set. Particularly, when M'=M=1, the network device may not configure the reporting indication information, and after performing measurement based on one indicated CSI-RS resource set, the terminal device reports a CSI report corresponding to the CSI-RS resource set. Particularly, when M=1, the network device instructs the terminal device to report one or more of the at least one CSI report obtained through measurement based on the CSI-RS resource set.

The reporting indication information may further instruct the terminal device to report an identifier of a CSI-RS resource set corresponding to each of the K CSI reports. In this case, the CSI measurement result may further include the identifier of the CSI-RS resource set corresponding to each of the K CSI reports, so that the network device establishes a correspondence between the CSI report and the CSI-RS resource set.

When the quantity of NZP CSI-RS resources included in the resource configuration information used for channel measurement is greater than 1, the reporting indication information may further instruct the terminal device to report an identifier of a correspondence corresponding to each of the K CSI reports.

Optionally, the network device sends the reporting indication information to the terminal device by using the dynamic signaling, and after performing measurement based on the M CSI-RS resource sets, the terminal device performs reporting based on the reporting indication information. The reporting indication information instructs the terminal device to report K CSI reports, and the K CSI reports are K of the M' CSI reports corresponding to the M CSI-RS resource sets, where K is a positive integer, and 1≤K≤M'. In this case, the CSI measurement result includes the K CSI reports.

The K CSI reports may be the first K CSI reports that are in the M' CSI reports and that are arranged in a particular order, for example, the first K CSI reports in an order of priorities, or the first K CSI reports in an order of values of a parameter.

When K=M', the network device instructs the terminal device to report the M' CSI reports corresponding to the M CSI-RS resource sets. When K=1, the network device instructs the terminal device to report one of the M' CSI reports, and the terminal device may report one optimal CSI report in the M' CSI reports. The optimal CSI report may be a CSI report whose particular parameter has a largest value, for example, a CQI has a largest value. When K=M=1, the network device instructs the terminal device to perform measurement based on one CSI-RS resource set and feed back one CSI report, and the terminal device reports one of at least one CSI report obtained through measurement based on the CSI-RS resource set. Particularly, when M'=M=1, after performing measurement based on one indicated CSI-RS resource set, the terminal device reports a CSI report corresponding to the CSI-RS resource set. Particularly, when M=1, the network device instructs the terminal device to report one or more of the at least one CSI report obtained through measurement based on the CSI-RS resource set.

The reporting indication information may further indicate an identifier of a CSI-RS resource set corresponding to each of the K CSI reports, in other words, the network device instructs the terminal device to report CSI reports corresponding to specific CSI-RS resource sets.

The reporting indication information may further instruct the terminal device to report the identifier of the CSI-RS resource set corresponding to each of the K CSI reports. In this case, the CSI measurement result may further include the identifier of the CSI-RS resource set corresponding to each of the K CSI reports, so that the network device establishes a correspondence between the CSI report and the CSI-RS resource set.

When the quantity of NZP CSI-RS resources included in the resource configuration information used for channel measurement is greater than 1, the reporting indication information may further indicate an identifier of a correspondence corresponding to each of the K CSI reports.

When the quantity of NZP CSI-RS resources included in the resource configuration information used for channel measurement is greater than 1, the reporting indication information may further instruct the terminal device to report the identifier of the correspondence corresponding to each of the K CSI reports.

Optionally, when the terminal device receives the measurement resource indication information, the network device sends the reporting indication information to the terminal device by using the dynamic signaling, and after performing measurement based on the N CSI-RS resource sets, the terminal device performs reporting based on the reporting indication information. The reporting indication information instructs the terminal device to report L CSI reports, and the L CSI reports are L of N' CSI reports corresponding to the N CSI-RS resource sets, where L and N' are positive integers, 1≤L≤N', and N≤N'. In this case, the CSI measurement result includes the L CSI reports.

The L CSI reports may be the first L CSI reports that are in the N' CSI reports and that are arranged in a particular order, for example, the first L CSI reports in an order of priorities, or the first L CSI reports in an order of values of a parameter.

When L=N', the network device instructs the terminal device to report all CSI reports corresponding to the N CSI-RS resource sets. When L=1, the network device instructs the terminal device to report one of the N' CSI reports, and the terminal device may report one optimal CSI report in the N' CSI reports. The optimal CSI report may be a CSI report whose particular parameter has a largest value, for example, a CQI has a largest value. When L=N=1, the network device instructs the terminal device to perform measurement based on one CSI-RS resource set and feed back one CSI report, and the terminal device reports one of at least one CSI report obtained through measurement based on the CSI-RS resource set. Particularly, when N'=N=1, after performing measurement based on one indicated CSI-RS resource set, the terminal device reports a CSI report corresponding to the CSI-RS resource set. Particularly, when N=1, the network device instructs the terminal device to report one or more of the at least one CSI report obtained through measurement based on the indicated CSI-RS resource set.

The reporting indication information may further instruct the terminal device to report an identifier of a CSI-RS resource set corresponding to each of the L CSI reports. In this case, the CSI measurement result may further include the identifier of the CSI-RS resource set corresponding to each of the L CSI reports, so that the network device establishes a correspondence between the CSI report and the CSI-RS resource set.

When the quantity of NZP CSI-RS resources included in the resource configuration information used for channel measurement is greater than 1, the reporting indication information may further instruct the terminal device to report an identifier of a correspondence corresponding to each of the K CSI reports.

For the foregoing several optional manners, when the reporting indication information instructs the terminal device to report one CSI report, indication may be performed by using the reporting indication information by using $\lceil \log_2^N \rceil$ bits. Based on FIG. 7, an example in which N=4 is used, and two bits may be used for indication. For example, "00" instructs the terminal device to report a first CSI report corresponding to the CSI-RS resource set #1, "01" instructs the terminal device to report a second CSI report corresponding to the CSI-RS resource set #2, "10" instructs the terminal device to report a third CSI report corresponding to the CSI-RS resource set #3, and "11" instructs the terminal device to report a fourth CSI report corresponding to the CSI-RS resource set #4.

When the quantity of NZP CSI-RS resources included in the resource configuration information used for channel measurement is equal to 1, the terminal device may indicate the identifier of the CSI-RS resource set in the following two manners:

Manner 1: The terminal device indicates the identifier of the CSI-RS resource set by using an N-bit bitmap. Based on FIG. 7, it is assumed that the TRP 1 instructs the terminal device to perform measurement based on the CSI-RS resource set #1 to the CSI-RS resource set #4, that is, N=4, and the TRP 1 further instructs the terminal device to report one CSI report, that is, L=1. In this case, the terminal device reports one CSI report, and sets a bit of the CSI-RS resource set corresponding to the CSI report in a 4-bit bitmap. For example, the CSI report reported by the terminal device corresponds to the CSI-RS resource set #3. In this case, when reporting the CSI report, the terminal device may report a 4-bit bitmap "0100", to indicate that a sequence number of the CSI-RS resource set corresponding to the CSI report is 3.

Based on FIG. 7, it is assumed that the TRP 1 instructs the terminal device to perform interference measurement based on the CSI-RS resource set #1 to the CSI-RS resource set #4, that is, N=4, and the TRP 1 further instructs the terminal device to report two CSI reports, that is, L=2. In this case, the terminal device reports two CSI reports, and sets bits of CSI-RS resource sets corresponding to the two CSI reports in a 4-bit bitmap. For example, the two CSI reports reported by the terminal device correspond to the CSI-RS resource set #1 and the CSI-RS resource set #3. In this case, when reporting the two CSI reports, the terminal device may report a 4-bit bitmap "0101", to indicate that sequence numbers of the CSI-RS resource sets corresponding to the two CSI reports are respectively 1 and 3.

Manner 2: The terminal device indicates the identifier of the CSI-RS resource set by using $L \times \lceil \log_2^N \rceil$ bits. Based on FIG. 7, it is assumed that the TRP 1 instructs the terminal device to perform interference measurement based on the CSI-RS resource set #1 to the CSI-RS resource set #4, that is, N=4, and the TRP 1 further instructs the terminal device to report one CSI report, that is, L=1. In this case, the terminal device reports one CSI report, and indicates, by using two bits, an identifier of a CSI-RS resource set corresponding to the CSI report. For example, the CSI report reported by the terminal device corresponds to the CSI-RS resource set #3. In this case, when reporting the CSI report, the terminal device may report two bits "10" (refer to the table in step S204), to indicate that a sequence number of the CSI-RS resource set corresponding to the CSI report is 3.

Based on FIG. 7, it is assumed that the TRP 1 instructs the terminal device to perform interference measurement based on the CSI-RS resource set #1 to the CSI-RS resource set #4, that is, N=4, and the TRP 1 further instructs the terminal device to report two CSI reports, that is, L=2. In this case, the terminal device reports two CSI reports, and indicates, by using four bits, identifiers of CSI-RS resource sets corresponding to the two CSI reports. For example, the two CSI reports reported by the terminal device correspond to the CSI-RS resource set #1 and the CSI-RS resource set #3. In this case, when reporting the two CSI reports, the terminal device may report four bits "0010", to indicate that sequence numbers of the CSI-RS resource sets corresponding to the two CSI reports are respectively 1 and 3.

In addition to the foregoing two manners, the terminal device may further indicate the identifier of the CSI-RS resource set in another manner, and a specific used manner is not limited in this embodiment of the present invention.

The terminal device performs reporting for the CSI-RS resource set, and performs reporting based on the reporting indication information, so that when the quantity of coordinated base stations is increased, reporting overheads can be reduced.

Step S206: The network device receives the CSI measurement result sent by the terminal device.

Specifically, the network device receives the CSI measurement result sent by the terminal device, and may determine a multi-base station coordinated transmission scheme, corresponding adaptive link configuration, and a scheduling policy based on the CSI measurement result.

In the embodiment shown in FIG. 4, the network device configures and sends the at least one piece of CSI reporting configuration information and the resource configuration information corresponding to the at least one piece of CSI reporting configuration information, so that the terminal device performs measurement based on the resource configuration information corresponding to the at least one piece of CSI reporting configuration information. Therefore, when the quantity of coordinated base stations is increased, only the quantity of configured CSI-RS resource sets needs to be increased, and neither an amount of CSI reporting configuration information nor an amount of resource configuration information needs to be increased, so that the system can be scalable. In addition, a same CSI-RS resource may be shared among a plurality of CSI-RS resource sets, so that downlink transmission resources can be saved, and a degree of sharing a measurement resource and a measurement result can be increased.

Figure 9:
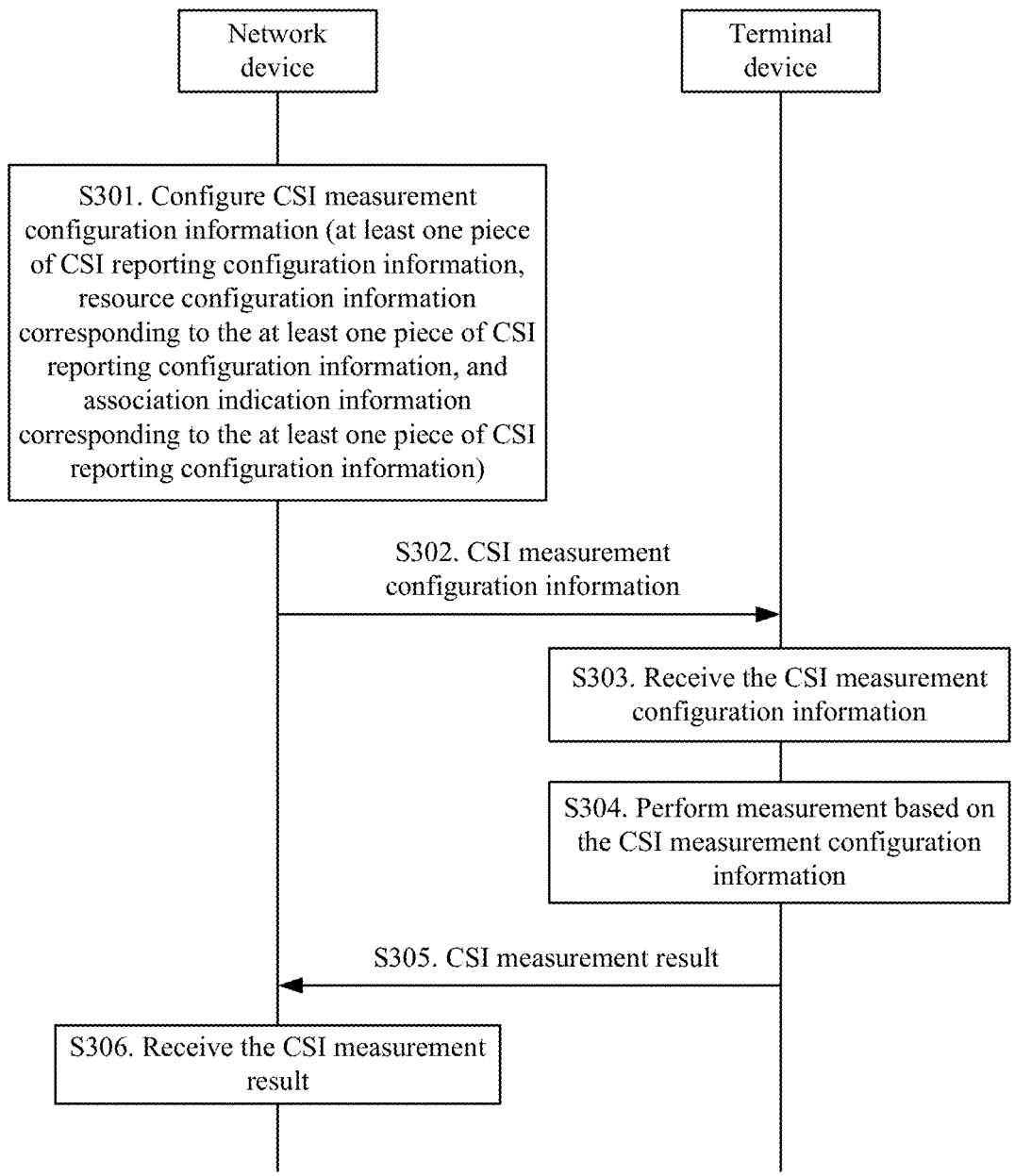
FIG. 9 is a schematic communication diagram of another channel state information processing method according to an embodiment of the present invention.

FIG. 9 is a schematic communication diagram of another channel state information processing method according to an embodiment of the present invention. Description is provided from the perspective of interaction between a network device and a terminal device, and the method includes but is not limited to the following steps.

Step S301: A network device configures CSI measurement configuration information, where the CSI measurement configuration information includes at least one piece of CSI reporting configuration information, resource configuration information corresponding to the at least one piece of CSI reporting configuration information, and association indication information corresponding to the at least one piece of CSI reporting configuration information.

Specifically, the network device configures the CSI measurement configuration information (CSI Measurement Setting), and the CSI measurement configuration information includes the at least one piece of CSI reporting configuration information, the resource configuration information corresponding to the at least one piece of CSI reporting configuration information, and the association indication information corresponding to the at least one piece of CSI reporting configuration information. One piece of the CSI reporting configuration information corresponds to at least two pieces of resource configuration information. One piece of the CSI reporting configuration information corresponds to at least two pieces of association indication information. For the at least one piece of CSI reporting configuration information, the resource configuration information corresponding to the at least one piece of CSI reporting configuration information, and the association indication information corresponding to the at least one piece of CSI reporting configuration information, refer to the description of the information in step S201 in the embodiment shown in FIG. 4, and details are not described herein again.

FIG. 10 is a configuration example table based on FIG. 1 according to an embodiment of the present invention. The example table shown in FIG. 10 may correspond to the example diagram shown in FIG. 7, and a difference lies in that in the example table shown in FIG. 10, a CSI reporting setting, a resource setting, and a link are included in a CSI measurement setting.

Optionally, the network device instructs, by using dynamic signaling, the terminal device to perform measurement based on one or more CSI resource sets. The dynamic signaling may include measurement resource indication information. For description of the measurement resource indication information, refer to the description of the measurement resource indication information in the embodiment shown in FIG. 4, and details are not described herein again.

Step S302: The network device sends the CSI measurement configuration information to a terminal device.

Step S303: The terminal device receives the CSI measurement configuration information sent by the network device.

Step S304: The terminal device performs measurement based on the CSI measurement configuration information.

Specifically, the terminal device performs measurement based on resource configuration information that corresponds to the at least one piece of CSI reporting configuration information and that is used for channel measurement, and performs measurement based on resource configuration information that corresponds to the at least one piece of CSI reporting configuration information and that is used for interference measurement. For details, refer to the detailed description of step S204 in the embodiment shown in FIG. 4, and details are not described herein again.

Step S305: The terminal device sends a CSI measurement result to the network device.

Step S306: The network device receives the CSI measurement result sent by the terminal device.

For specific implementation processes of step S305 and step S306, refer to the detailed description of step S205 and step S206 in the embodiment shown in FIG. 4, and details are not described herein again.

In the embodiment shown in FIG. 9, the network device configures the CSI measurement configuration information, so that the terminal device performs measurement based on the CSI measurement configuration information, to achieve a same beneficial effect as the embodiment shown in FIG. 4.

The foregoing describes in detail the method in the embodiments of the present invention, and the following describes the apparatus provided in the embodiments of the present invention.

FIG. 11 is a schematic diagram of a logical structure of a network device according to an embodiment of the present invention. A network device 301 may include a processing unit 3011 and a sending unit 3012.

The processing unit 3011 is configured to configure at least one piece of CSI reporting configuration information and resource configuration information corresponding to the at least one piece of CSI reporting configuration information. One piece of the CSI reporting configuration information corresponds to at least two pieces of resource configuration information, one of the at least two pieces of resource configuration information is used for interference measurement and includes a CSI-RS resource set, one of the at least two pieces of resource configuration information is used for channel measurement and includes an NZP CSI-RS resource, and one CSI-RS resource set corresponds to at least one CSI report.

The sending unit 3012 is configured to send the at least one piece of CSI reporting configuration information and the resource configuration information corresponding to the at least one piece of CSI reporting configuration information to a terminal device.

The sending unit 3012 is further configured to send measurement resource indication information to the terminal device. The measurement resource indication information instructs the terminal device to perform measurement based on N CSI-RS resource sets, the N CSI-RS resource sets are N of M CSI-RS resource sets, and the M CSI-RS resource sets are all CSI-RS resource sets corresponding to the at least one piece of CSI reporting configuration information, where M and N are positive integers, and $1 \leq N \leq M$.

The sending unit 3012 is further configured to send reporting indication information to the terminal device. The reporting indication information instructs the terminal device to report L CSI reports, and the L CSI reports are L of N' CSI reports corresponding to the N CSI-RS resource sets, where L and N' are positive integers, $1 \leq L \leq N'$, and $N \leq N'$.

The sending unit 3012 is further configured to send reporting indication information to the terminal device. The reporting indication information instructs the terminal device to report K CSI reports, the K CSI reports are K of M' CSI reports corresponding to M CSI-RS resource sets, and the M CSI-RS resource sets are all CSI-RS resource sets corresponding to the at least one piece of CSI reporting configuration information, where M, M', and K are positive integers, $1 \leq K \leq M'$, and $M \leq M'$.

The processing unit 3011 is further configured to configure association indication information corresponding to the at least one piece of CSI reporting configuration information. One piece of the CSI reporting configuration information corresponds to at least two pieces of association indication information. One of the at least two pieces of association indication information indicates an identifier of the CSI reporting configuration information and an identifier of one piece of the resource configuration information, and indicates that the resource configuration information is used for channel measurement. One of the at least two pieces of association indication information indicates the identifier of the CSI reporting configuration information and an identifier of one piece of the resource configuration information, and indicates that the resource configuration information is used for interference measurement.

The sending unit 3012 is further configured to send the association indication information corresponding to the at least one piece of CSI reporting configuration information to the terminal device.

It should be noted that the processing unit 3011 is configured to perform step S201 in the method embodiment shown in FIG. 4, and the sending unit 3012 is configured to perform step S202 in the method embodiment shown in FIG. 4. The network device 302 may further include a receiving unit 3013, not shown in FIG. 11. The receiving unit 3013 is configured to perform step S206 in the method embodiment shown in FIG. 4.

Figure 12:
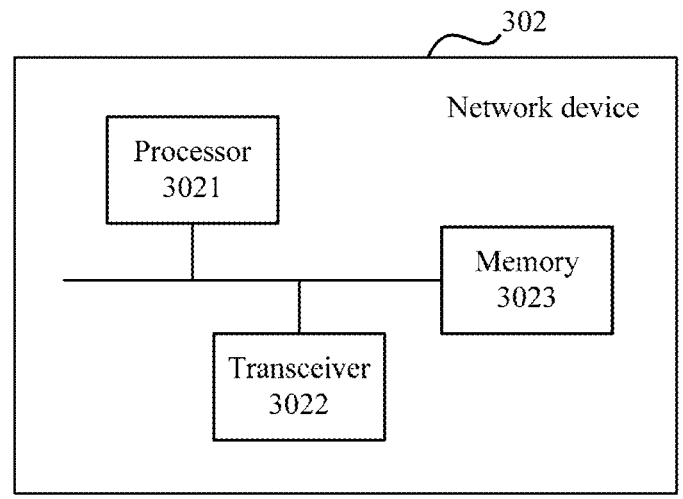
FIG. 12 is a schematic diagram of a physical structure of a network device according to an embodiment of the present invention.

When the processing unit 3011 is a processor, and the sending unit 3012 and the receiving unit 3013 are a transceiver, a schematic diagram of a physical structure of the network device may be shown in FIG. 12. A network device 302 shown in FIG. 12 includes a processor 3021, a transceiver 3022, and a memory 3023. The processor 3021, the memory 3023, and the transceiver 3022 are connected to each other by using a bus.

The memory 3023 includes but is not limited to a random access memory (RAM), a read-only memory (ROM), an erasable programmable read only memory (EPROM), or a compact disc read-only memory (CD-ROM). The memory 3023 is configured to store a related instruction and related data.

The transceiver 3022 may be a communications module or a transceiver circuit, configured to implement transmission of information such as data and signaling between the network device and the terminal device. During application in this embodiment of the present invention, the transceiver 3022 is configured to: send configuration information, and receive a CSI measurement result, and is specifically configured to perform step S202 and step S206 in the method embodiment shown in FIG. 4.

The processor 3021 may be a controller, a central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. The controller/processor may implement or execute various example logical blocks, modules, and circuits described with reference to content disclosed in the embodiments of the present invention. Alternatively, the processor 3021 may be a combination implementing a computing function, for example, a combination including one or more microprocessors, or a combination of a DSP and a microprocessor. During application in this embodiment of the present invention, the processor 3021 is configured to configure CSI reporting configuration information, resource configuration information, association indication information, and the like, and is specifically configured to perform step S201 in the method embodiment shown in FIG. 4.

Figure 13:
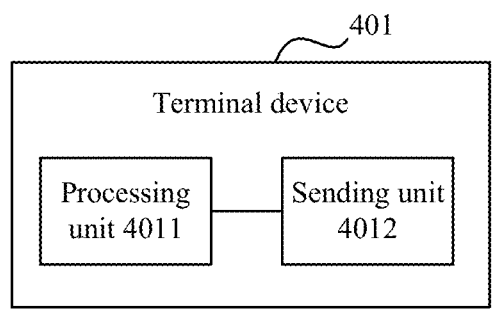
FIG. 13 is a schematic diagram of a logical structure of a terminal device according to an embodiment of the present invention.

FIG. 13 is a schematic diagram of a logical structure of a terminal device according to an embodiment of the present invention. The terminal device 401 may include a processing unit 4011 and a sending unit 4012.

The processing unit 4011 is configured to perform measurement based on resource configuration information corresponding to at least one piece of CSI reporting configuration information. One piece of the CSI reporting configuration information corresponds to at least two pieces of resource configuration information, one of the at least two pieces of resource configuration information is used for interference measurement and includes a channel state information-reference signal CSI-RS resource set, and one of the at least two pieces of resource configuration information is used for channel measurement and includes an NZP CSI-RS resource.

The sending unit 4012 is configured to send a CSI measurement result to a network device. The CSI measurement result includes a CSI report, and one CSI-RS resource set corresponds to at least one CSI report.

The processing unit 4011 is specifically configured to: perform measurement based on the resource configuration information that corresponds to the at least one piece of CSI reporting configuration information and that is used for channel measurement, and perform measurement based on the resource configuration information that corresponds to the at least one piece of CSI reporting configuration information and that is used for interference measurement.

The processing unit 4011 is specifically configured to perform measurement based on a resource set indicated by measurement resource indication information sent by the network device. The measurement resource indication information instructs the terminal device to perform measurement based on N CSI-RS resource sets, the N CSI-RS resource sets are N of M CSI-RS resource sets, and the M CSI-RS resource sets are all CSI-RS resource sets corresponding to the at least one piece of CSI reporting configuration information, where M and N are positive integers, and $1 \leq N \leq M$.

The sending unit 4012 is specifically configured to send the CSI measurement result to the network device based on reporting indication information sent by the network device. The CSI measurement result includes L CSI reports, and the L CSI reports are L of N' CSI reports corresponding to the N CSI-RS resource sets, where L and N' are positive integers, $1 \leq L \leq N'$, and $N \leq N'$.

The sending unit 4012 is specifically configured to send the CSI measurement result to the network device based on reporting indication information. The CSI measurement result includes K CSI reports, the K CSI reports are K of M' CSI reports corresponding to M CSI-RS resource sets, and the M CSI-RS resource sets are all CSI-RS resource sets corresponding to the at least one piece of CSI reporting configuration information, where M, M', and K are positive integers, $1 \leq K \leq M'$, and $M \leq M'$.

A receiving unit 4013 is further configured to receive the at least one piece of CSI reporting configuration information and the resource configuration information corresponding to the at least one piece of CSI reporting configuration information that are sent by the network device.

The receiving unit 4013 is further configured to receive association indication information that corresponds to the at least one piece of CSI reporting configuration information and that is sent by the network device. One piece of the CSI reporting configuration information corresponds to at least two pieces of association indication information. One of the at least two pieces of association indication information indicates an identifier of the CSI reporting configuration information and an identifier of one piece of the resource configuration information, and indicates that the resource configuration information is used for channel measurement. One of the at least two pieces of association indication information indicates the identifier of the CSI reporting configuration information and an identifier of one piece of the resource configuration information, and indicates that the resource configuration information is used for interference measurement.

It should be noted that the processing unit 4011 is configured to perform step S204 in the method embodiment shown in FIG. 4, and the sending unit 4012 is configured to perform step S205 in the method embodiment shown in FIG. 4. The terminal device 402 may further include a receiving unit 4013, not shown in FIG. 13. The receiving unit 4013 is configured to perform step S203 in the method embodiment shown in FIG. 4.

Figure 14:
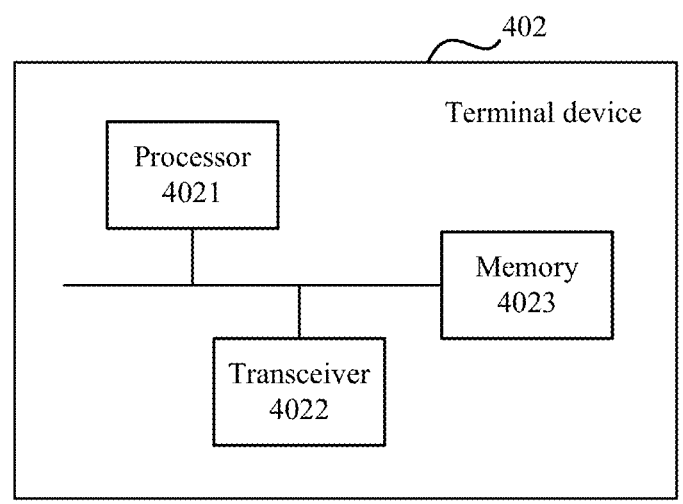
FIG. 14 is a schematic diagram of a physical structure of a terminal device according to an embodiment of the present invention.

When the processing unit 4011 is a processor, and the sending unit 4012 and the receiving unit 4013 are a transceiver, a schematic diagram of a physical structure of the terminal device may be shown in FIG. 14. A terminal device 402 shown in FIG. 14 includes a processor 4021, a transceiver 4022, and a memory 4023. The processor 4021, the memory 4023, and the transceiver 4022 are connected to each other by using a bus.

The memory 4023 includes but is not limited to a RAM, a ROM, an EPROM, or a CD-ROM. The memory 4023 is configured to store a related instruction and related data.

The transceiver 4022 may be a communications module or a transceiver circuit, configured to implement transmission of information such as data and signaling between the terminal device and the network device. During application in this embodiment of the present invention, the transceiver 4022 is configured to: receive configuration information, and send a CSI measurement result, and is specifically configured to perform step S203 and step S205 in the method embodiment shown in FIG. 4.

The processor 4021 may be a controller, a CPU, a general-purpose processor, an ASIC, an FPGA or another programmable logic device, a transistor logic device, a hardware component, or any combination thereof. The controller/processor may implement or execute various example logical blocks, modules, and circuits described with reference to content disclosed in the embodiments of the present invention. Alternatively, the processor 4021 may be a combination implementing a computing function, for example, a combination including one or more microprocessors, or a combination of a DSP and a microprocessor. During application in this embodiment of the present invention, the processor 4021 is configured to perform measurement, and is specifically configured to perform step S204 in the method embodiment shown in FIG. 4.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any available medium accessible by a computer, or a data storage device, for example, a server or a data center, integrating one or more available mediums. The available medium may be a magnetic medium (for example, a floppy disk, a hard disk, or a magnetic tape), an optical medium (for example, a digital video disc (DVD)), a semiconductor medium (for example, a solid state disk (SSD)), or the like.

What is claimed is:

1. A channel state information processing method, comprising:
    configuring, by a network device, at least one piece of channel state information (CSI) reporting configuration information and resource configuration information corresponding to the at least one piece of CSI reporting configuration information, wherein one piece of the CSI reporting configuration information corresponds to at least two pieces of resource configuration information, wherein one of the at least two pieces of resource configuration information is used for interference measurement and comprises a plurality of channel state information-reference signal (CSI-RS) resource sets, wherein at least two of the plurality of CSI-RS resource sets comprise a non-zero power channel state information-reference signal (NZP CSI-RS) resource allocated to a second network device, wherein each CSI-RS resource set corresponds to one CSI report, and wherein the plurality of CSI-RS resource sets correspond to a plurality of interference measurement hypotheses configured by the network device; and
    sending, by the network device, the at least one piece of CSI reporting configuration information and the resource configuration information corresponding to the at least one piece of CSI reporting configuration information to a terminal device.

2. The method according to claim 1, wherein the network device and the second network device are coordinated transmission base stations in a multi-base station coordinated multipoint transmission scenario.

3. The method according to claim 1, wherein the network device increases a quantity of CSI-RS resource sets when a quantity of coordinated base stations is increased, without increasing a quantity of the at least one piece of CSI reporting configuration information or a quantity of the resource configuration information.

4. The method according to claim 1, further comprising sending measurement resource indication information to the terminal device, wherein the measurement resource indication information instructs the terminal device to perform measurement based on N CSI-RS resource sets, wherein the N CSI-RS resource sets are N of M CSI-RS resource sets, and wherein the M CSI-RS resource sets are all CSI-RS resource sets corresponding to the at least one piece of CSI reporting configuration information, wherein M and N are positive integers, and $1 \leq N \leq M$.

5. The method according to claim 1, wherein the configuration information of the CSI report instructs the terminal device to report content of the CSI report, and the content of the CSI report includes at least one of a channel quality indicator (CQI), a precoding matrix indicator (PMI), a rank indication (RI), or a channel state information-reference signal resource indicator (CRI).

6. The method according to claim 1, wherein the configuration information of the CSI report instructs the terminal device to report at least one of a time-domain characteristic or a frequency-domain characteristic.

7. The method according to claim 1, wherein one of the plurality of CSI-RS resource sets comprises the NZP CSI-RS resource allocated to the second network device and a second NZP CSI-RS resource allocated to a third network device.

8. A channel state information processing method, comprising:
    performing, by a terminal device, measurement based on resource configuration information corresponding to at least one piece of channel state information (CSI) reporting configuration information received from a network device, wherein one piece of the CSI reporting configuration information corresponds to at least two pieces of resource configuration information, wherein one of the at least two pieces of resource configuration information is used for interference measurement and comprises a plurality of channel state information-reference signal (CSI-RS) resource sets, wherein at least two of the plurality of CSI-RS resource sets comprise a non-zero power channel state information-reference signal (NZP CSI-RS) resource allocated to a second network device, and wherein the plurality of CSI-RS resource sets correspond to a plurality of interference measurement hypotheses; and
    sending, by the terminal device, a CSI measurement result to the network device, wherein the CSI measurement result comprises the CSI report, and wherein each CSI-RS resource set corresponds to one CSI report.

9. A network device, comprising at least one processor, one or more memories, and a transceiver, wherein:
    the one or more memories are coupled to the at least one processor and store programming instructions for execution by at least one processor to configure at least one piece of channel state information (CSI) reporting configuration information and resource configuration information corresponding to the at least one piece of CSI reporting configuration information, wherein one piece of the CSI reporting configuration information corresponds to at least two pieces of resource configuration information, wherein one of the at least two pieces of resource configuration information is used for interference measurement and comprises a plurality of channel state information-reference signal (CSI-RS) resource sets, wherein at least two of the plurality of CSI-RS resource sets comprise a non-zero power channel state information-reference signal (NZP CSI-RS) resource allocated to a second network device, wherein each CSI-RS resource set corresponds to one CSI report, and wherein the plurality of CSI-RS resource sets correspond to a plurality of interference measurement hypotheses configured by the network device; and the transceiver is configured to send the at least one piece of CSI reporting configuration information and the resource configuration information corresponding to the at least one piece of CSI reporting configuration information to a terminal device.

10. The network device according to claim 9, wherein:
the transceiver is further configured to send measurement resource indication information to the terminal device, wherein the measurement resource indication information instructs the terminal device to perform measurement based on N CSI-RS resource sets, wherein the N CSI-RS resource sets are N of M CSI-RS resource sets, and wherein the M CSI-RS resource sets are all CSI-RS resource sets corresponding to the at least one piece of CSI reporting configuration information, wherein M and N are positive integers, and 1≤N≤M.

11. The network device according to claim 10, wherein:
the transceiver is further configured to send reporting indication information to the terminal device, wherein the reporting indication information instructs the terminal device to report L CSI reports, and wherein the L CSI reports are L of N' CSI reports corresponding to the N CSI-RS resource sets, wherein L and N' are positive integers, 1≤L≤N', and N≤N'.

12. The network device according to claim 11, wherein the reporting indication information further indicates an identifier of a CSI-RS resource set corresponding to each of the L CSI reports, or the reporting indication information further instructs the terminal device to report an identifier of a CSI-RS resource set corresponding to each of the L CSI reports.

13. A terminal device, comprising at least one processor, one or more memories, and a transceiver, wherein:
the one or more memories are coupled to the at least one processor and store programming instructions for execution by at least one processor to perform measurement based on resource configuration information corresponding to at least one piece of channel state information (CSI) reporting configuration information received from a network device, wherein one piece of the CSI reporting configuration information corresponds to at least two pieces of resource configuration information, wherein one of the at least two pieces of resource configuration information is used for interference measurement and comprises a plurality of channel state information-reference signal (CSI-RS) resource sets, wherein at least two of the plurality of CSI-RS resource sets comprise a non-zero power channel state information-reference signal (NZP CSI-RS) resource allocated to a second network device, and wherein the plurality of CSI-RS resource sets correspond to a plurality of interference measurement hypotheses; and
the transceiver is configured to send a CSI measurement result to the network device, wherein the CSI measurement result comprises the CSI report, and wherein each CSI-RS resource set corresponds to one CSI report.

14. The terminal device according to claim 13, wherein the programming instructions are for execution by the at least one processor to:

perform measurement based on the resource configuration information that corresponds to the at least one piece of CSI reporting configuration information and that is used for channel measurement; and perform measurement based on the resource configuration information that corresponds to the at least one piece of CSI reporting configuration information and that is used for interference measurement.

15. The terminal device according to claim 14, wherein the programming instructions are for execution by the at least one processor to perform measurement based on a resource set indicated by measurement resource indication information sent by the network device, wherein the measurement resource indication information instructs the terminal device to perform measurement based on N CSI-RS resource sets, wherein the N CSI-RS resource sets are N of M CSI-RS resource sets, and wherein the M CSI-RS resource sets are all CSI-RS resource sets corresponding to the at least one piece of CSI reporting configuration information, wherein M and N are positive integers, and 1≤N≤M.

16. The terminal device according to claim 15, wherein the transceiver is configured to send a CSI measurement result to the network device based on reporting indication information sent by the network device, wherein the CSI measurement result comprises L CSI reports, and wherein the L CSI reports are L of N' CSI reports corresponding to the N CSI-RS resource sets, wherein L and N' are positive integers, 1≤L≤N', and N≤N'.

17. The terminal device according to claim 16, wherein the reporting indication information further indicates an identifier of a CSI-RS resource set corresponding to each of the L CSI reports, or the CSI measurement result further comprises an identifier of a CSI-RS resource set corresponding to each of the L CSI reports.

18. A non-transitory computer readable storage medium, comprising instructions, wherein when the instructions run on a computer, the computer performs a channel state information processing method, and wherein the method comprises:

performing, measurement based on resource configuration information corresponding to at least one piece of channel state information (CSI) reporting configuration information received from a network device, wherein one piece of the CSI reporting configuration information corresponds to at least two pieces of resource configuration information, wherein one of the at least two pieces of resource configuration information is used for interference measurement and comprises a plurality of channel state information-reference signal (CSI-RS) resource sets, wherein at least two of the plurality of CSI-RS resource sets comprise a non-zero power channel state information-reference signal (NZP CSI-RS) resource allocated to a second network device, and wherein the plurality of CSI-RS resource sets correspond to a plurality of interference measurement hypotheses; and sending, a CSI measurement result to the network device, wherein the CSI measurement result comprises the CSI report, and wherein each CSI-RS resource set corresponds to one CSI report.

19. A chip, wherein the chip comprises a processor and interface, wherein the processor is configured to implement a channel state information processing method, and wherein the method comprises:

performing, measurement based on resource configuration information corresponding to at least one piece of channel state information (CSI) reporting configuration information received from a network device, wherein one piece of the CSI reporting configuration information corresponds to at least two pieces of resource configuration information, wherein one of the at least two pieces of resource configuration information is used for interference measurement and comprises a plurality of channel state information-reference signal (CSI-RS) resource sets, wherein at least two of the plurality of CSI-RS resource sets comprise a non-zero power channel state information-reference signal (NZP CSI-RS) resource allocated to a second network device, and wherein the plurality of CSI-RS resource sets correspond to at least one interference measurement hypothesis; and sending, a CSI measurement result to the network device, wherein the CSI measurement result comprises the CSI report, and wherein each CSI-RS resource set corresponds to one CSI report.

20. A chip, wherein the chip comprises a processor and a memory, wherein the memory stores a program instruction, and the processor is configured to read and execute the program instruction to implement a channel state information processing method, and wherein the method comprises:

performing, measurement based on resource configuration information corresponding to at least one piece of channel state information (CSI) reporting configuration information, wherein one piece of the CSI reporting configuration information corresponds to at least two pieces of resource configuration information received from a network device, wherein one of the at least two pieces of resource configuration information is used for interference measurement and comprises a plurality of channel state information-reference signal (CSI-RS) resource sets, wherein at least two of the plurality of CSI-RS resource sets comprise a non-zero power channel state information-reference signal (NZP CSI-RS) resource allocated to a second network device, and wherein the plurality of CSI-RS resource sets correspond to at least one interference measurement hypothesis; and sending, a CSI measurement result to the network device, wherein the CSI measurement result comprises the CSI report, and wherein each CSI-RS resource set corresponds to one CSI report.

* * * * *